(12) United States Patent
Kitayama

(10) Patent No.: US 8,661,471 B2
(45) Date of Patent: Feb. 25, 2014

(54) INFORMATION PROCESSING APPARATUS AND INFORMATION PROCESSING METHOD

(75) Inventor: Takefumi Kitayama, Tokyo (JP)

(73) Assignee: Sony Corporation, Tokyo (JP)

( * ) Notice: Subject to any disclaimer, the term of this patent is extended or adjusted under 35 U.S.C. 154(b) by 427 days.

(21) Appl. No.: 12/579,523

(22) Filed: Oct. 15, 2009

(65) Prior Publication Data

US 2010/0107196 A1 Apr. 29, 2010

(30) Foreign Application Priority Data

Oct. 29, 2008 (JP) ................................ 2008-278108
Oct. 29, 2008 (JP) ................................ 2008-278109

(51) Int. Cl.
*G06F 3/00* (2006.01)
*G06F 13/00* (2006.01)
*H04N 5/445* (2011.01)

(52) U.S. Cl.
USPC .................................. 725/46; 725/44; 725/39

(58) Field of Classification Search
USPC .............. 725/9, 14, 39, 44, 46, 131, 139, 151
See application file for complete search history.

(56) References Cited

U.S. PATENT DOCUMENTS

| | | | |
|---|---|---|---|
| 7,581,238 B1 * | 8/2009 | Taylor et al. ................... | 725/58 |
| 2002/0075320 A1 * | 6/2002 | Kurapati ....................... | 345/811 |
| 2002/0100047 A1 | 7/2002 | Matoba et al. | |
| 2005/0160461 A1 * | 7/2005 | Baumgartner et al. ......... | 725/52 |
| 2005/0251827 A1 * | 11/2005 | Ellis et al. ...................... | 725/47 |
| 2006/0236233 A1 * | 10/2006 | Ozawa et al. .................. | 715/517 |
| 2007/0005629 A1 | 1/2007 | Tokuda et al. | |

FOREIGN PATENT DOCUMENTS

| | | |
|---|---|---|
| EP | 1 843 583 A2 | 10/2007 |
| JP | 2000-341593 | 12/2000 |
| JP | 2003-18483 | 1/2003 |
| JP | 2004-343232 | 12/2004 |
| JP | 2005-210336 | 8/2005 |
| JP | 2007-74483 | 3/2007 |
| JP | 2007-221825 | 8/2007 |
| JP | 2007-281752 | 10/2007 |
| JP | 2008-48284 | 2/2008 |
| WO | WO 2006/043498 A1 | 4/2006 |
| WO | WO 2006/049150 A1 | 5/2006 |

OTHER PUBLICATIONS

European Search Report dated Dec. 17, 2010 in corresponding European Application No. 09 17 4473.
Office Action issued Aug. 3, 2010, in Japanese Patent Application, No. 2008-278109.
Office Action issued Aug. 13, 2010, in Japanese Patent Application, No. 2008-278108.

* cited by examiner

*Primary Examiner* — John Schnurr
(74) *Attorney, Agent, or Firm* — Oblon, Spivak, McClelland, Maier & Neustadt, L.L.P.

(57) ABSTRACT

There is provided an apparatus including an EPG acquiring unit configured to acquire EPG data, a selecting unit configured to select a target program, which is a target specifying which broadcast pattern of a plurality of broadcast patterns of the broadcasting program classified by a predetermined criteria; a broadcast pattern specifying unit configured to specify a broadcast pattern of the target program using EPG data of a reference date, which is a broadcasting day of the target program, past EPG data, and future EPG data; and a preference information generation unit configured to generate preference information subjected to weighting corresponding to the broadcast pattern of the broadcasting program based on viewing history information representing a viewing history of the broadcasting program and the broadcast pattern specified by the broadcast pattern specifying unit.

17 Claims, 20 Drawing Sheets

FIG.2A DAILY PATTERN
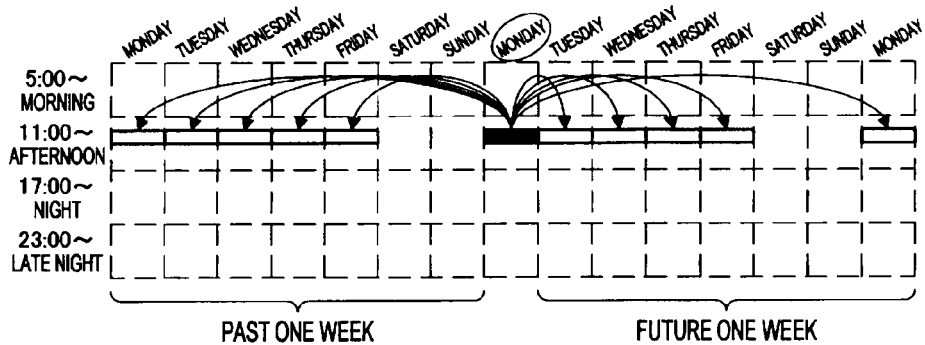
FIG.2B WEEKLY PATTERN
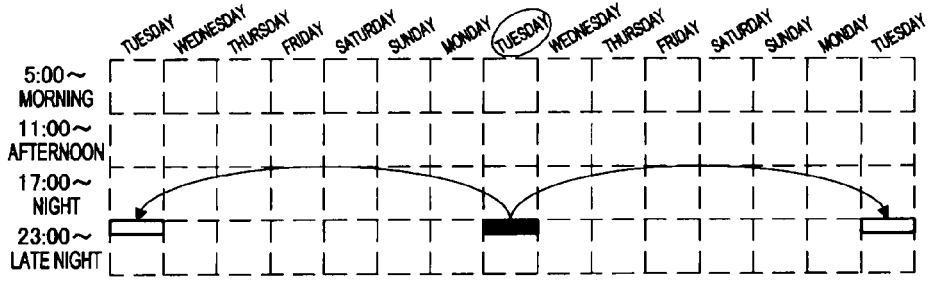
FIG.2C SPECIAL PROGRAM PATTERN
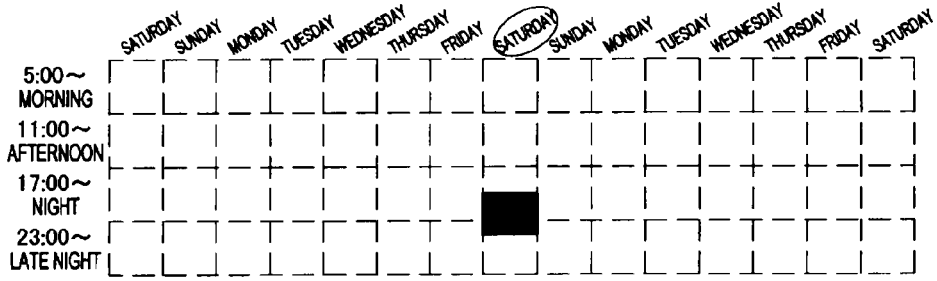
FIG.2D CONTINUOUS PATTERN
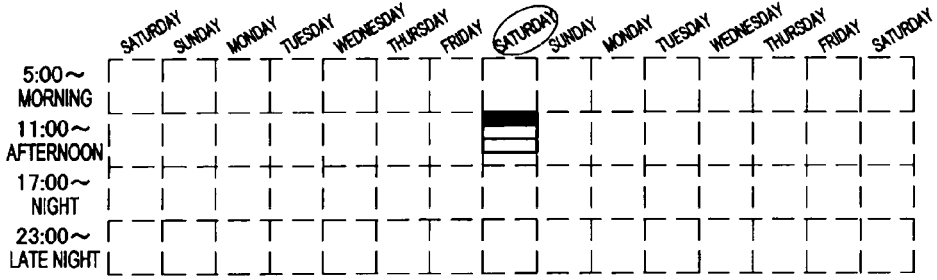

FIG. 13A DAILY PATTERN
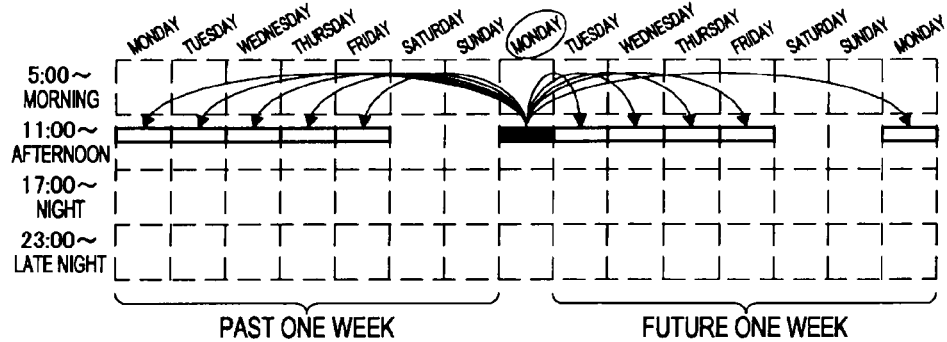
FIG. 13B WEEKLY PATTERN
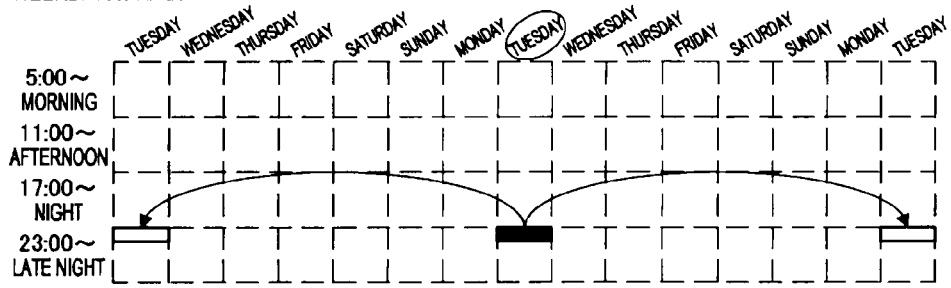
FIG. 13C SPECIAL PROGRAM PATTERN
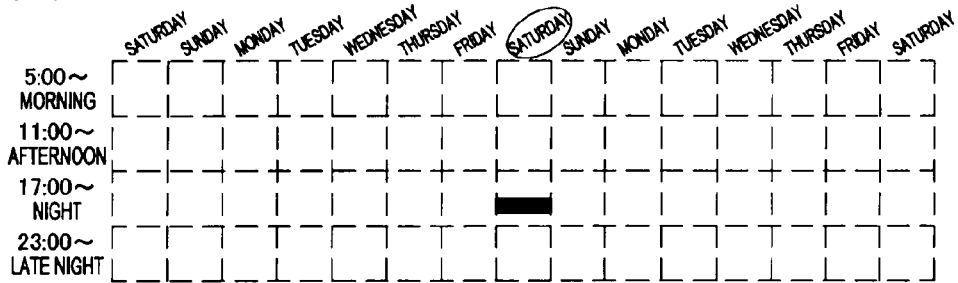
FIG. 13D DAILY SPECIAL PROGRAM PATTERN
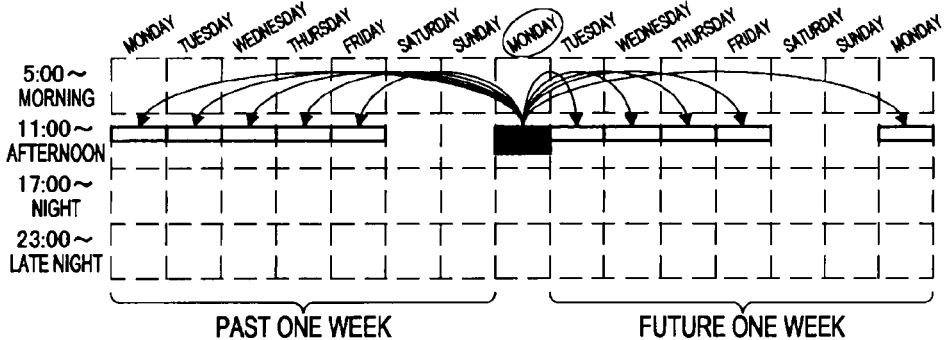
FIG. 13E WEEKLY SPECIAL PROGRAM PATTERN
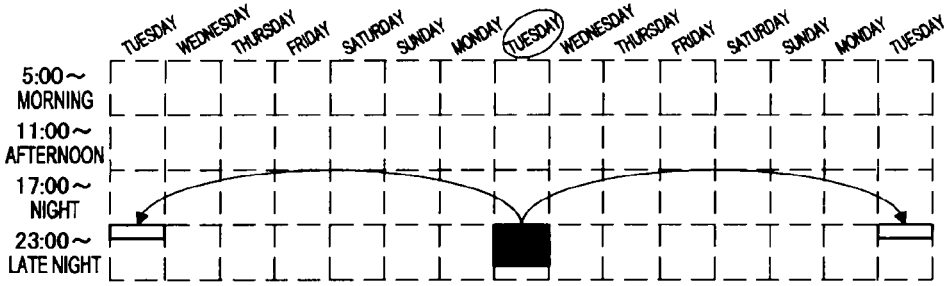

FIG.19

| 2/13 (TUE) | BS DIGITAL PROGRAM GUIDE, TELEVISION 7CH DISPLAY | | | | | | 2/13 (TUE) 0:26 PM |
|---|---|---|---|---|---|---|---|
| | ◁ 101 | ◇ 102 | ◇ 103 | ◇ 104 | ◇ 105 | ◇ 106 | 107 ▷ |
| PM 0 | 15 US | 15 OKASAN | | 00 AFTERNOON JOURNAL | 00 NEWS | ◁ MYSTERY SELECTION | ◁ CHINESE DRAMA OUCHOU | 0 |
| | 35 NEW YORK | | 25 FRANCE | 30 KARADA GA HOSHIGARU NINNNIKU | 30 HEALTH INFO RMATION | | | |
| | 55 ADVANCE IN | 35 CLASSIC ANIMATION | 50 JOURNEY TO | | | 54 TV SHOP | | |
| PM 1 | 00 NEWS | 00 LIVE BROADCASTS OF PARLIAMENTARY PROCEEDINGS "HOUSE OF REPREPRESENTATIVES BUDGE COMMITTEE QA" | 00 CLASSIC PHILHARMONIA | 00 TAIWAN DRAMA BARA NO KOI | 00 AFTERNOON NEWS ACCESS | 00 CBA AKINO K ANNSHASAI 👑 | 30 TUESDAY TELE-SHOP | 1 |
| | 15 ISLAND NEWS | | 55 RAISE HUMA | 54 ROYAL JELLY | 55 TV SHOP | | | |
| PM 2 | 00 NEWS | | 00 HIGH VISION FEATURE SE KIDO SEIMEI NO WA | 00 AFTERNOON JOURNAL | 00 BEAUTY AND DIET | | 25 J NAVIGATIO | 2 |
| | 15 US PBS "JIM LEHRER" | | | 30 BEAUTY INFO RMATION | 29 PRESENT TV | | 30 TV SHOP | |
| PM 3 | 00 NEWS | | | 00 AFTERNOON JOURNAL | 00 NEW LIFESTYLE SELECTION | | 00 HEALTH TV S HOPPING | 3 |
| | 15 US | | | | | | | |
| | 25 TOKYO MARK | | 50 YAMA KAWA | 30 HIRAKEI KEN NKOU NO TO BIRA | | | 30 STOCK WIDE | |
| | 55 OVERSEAS S ▷ | | 55 MINNNANO U | | 55 News Acce | 54 NEWS | 55 SHIAWASE O | |
| MUSIC | | MOVIE | | SPORT | | DRAMA | |

(BLUE) TODAY  (RED) TOMORROW  (GREEN) CHANNEL SELECTION  (YELLOW) ENLARGE/REDUCE  (DETERMINE) PROGRAM DESCRIPTION  (OPTION) FUNCTION DISPLAY  (RETURN) END 1121, 1121d, 1121e

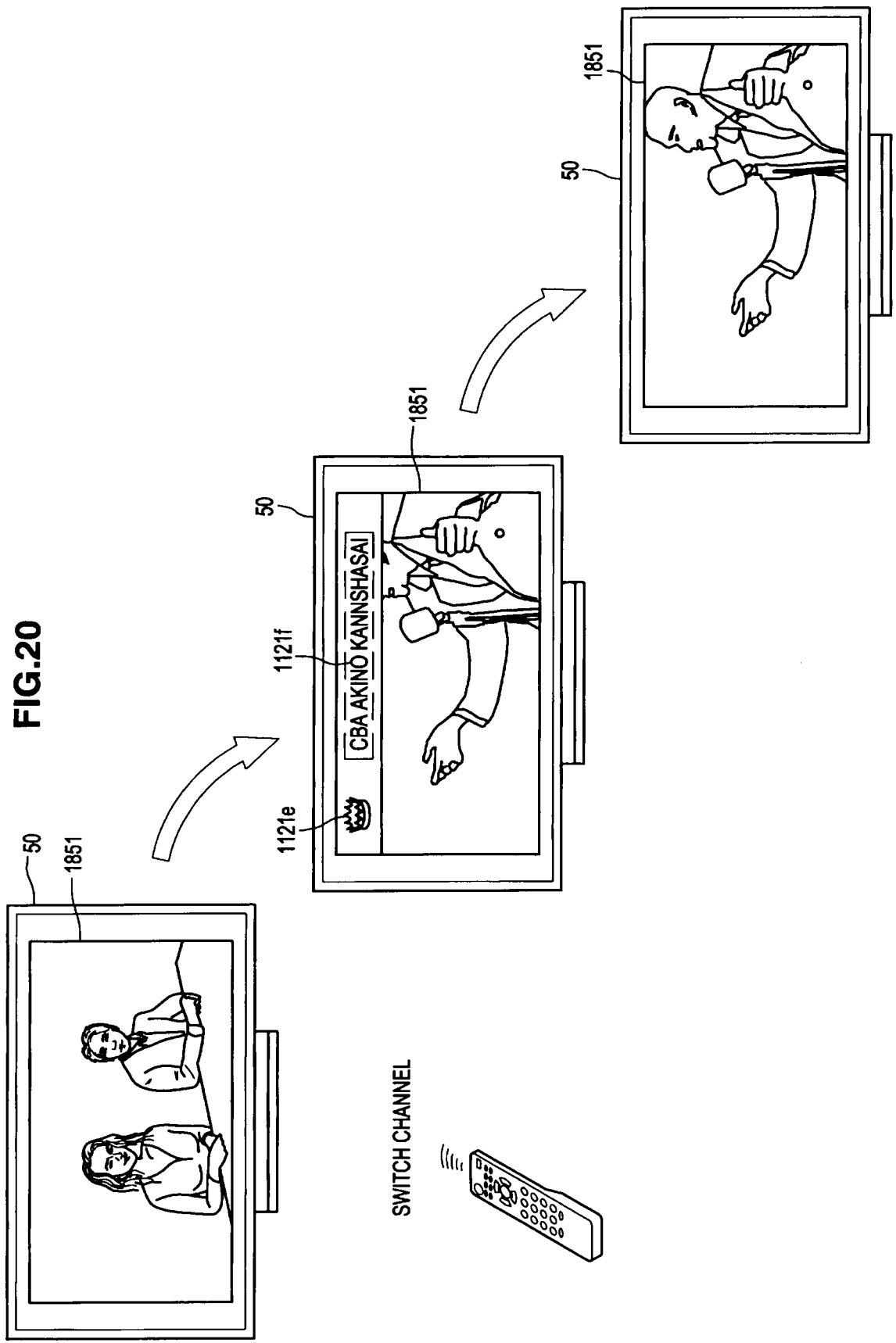

INFORMATION PROCESSING APPARATUS AND INFORMATION PROCESSING METHOD

BACKGROUND OF THE INVENTION

1. Field of the Invention

The present invention relates to an information processing apparatus and an information processing method, in particular, to an information processing apparatus having a function of urging the user to view broadcasting programs such as television broadcast and an information processing method.

2. Description of the Related Art

In recent years, a recording device such as a recorder, which incorporates a large capacity recording medium such as a hard disc and records broadcast television such as television broadcast, has been widely used. Such recording device acquires EPG (Electrical Program Guide) information contained in the broadcast signal obtained from the television broadcast wave transmitted from the broadcast station. The EPG information includes information representing program title, broadcast time and the like, where (programmed) recording of the program is carried out in the recording device based on the broadcast time and the like of the program contained in the EPG information.

Some of such recording devices generate the preference information from the history of the operation (e.g., rewinding, forwarding, etc.) performed by the user during the reproduction (viewing) of the program, the viewing history of the program, and the like, and perform presentation of the program assumed to be preferred by the user, automatic recording, automatic reproduction and the like (hereinafter referred to as "recommended") based on the preference information (see e.g., Japanese Patent Application Laid-Open No. 2007-74483). In the device described in Japanese Patent Application Laid-Open No. 2007-74483, the preference information is generated from the program viewed or operated by the user, and the program to be subsequently broadcasted is recommended based on such preference information.

In the above recording device, when recommending the program, the program is searched using a specific keyword instead of relying on the viewing history and the like, and the program that matches the keyword is recommended (see e.g., Japanese Patent Application Laid-Open No. 2004-343321). In the device described in Japanese Patent Application Laid-Open No. 2004-343321, the keyword assumed to match the preference of the user is registered in the device in advance or is periodically distributed, and the program that matches the keyword is recommended.

SUMMARY OF THE INVENTION

However, in the device described in Japanese Patent Application Laid-Open No. 2007-74483, the presentation of the program etc. tends to be made on the program with great number of operations or number of viewing as the information such as the operation history and the viewing history of the user are reflected on the preference information. Thus, the program with few broadcasting opportunity (e.g., special program that is broadcasted only once a year) tends to have less number of viewing than the program with greater broadcasting opportunity (e.g., program that is broadcasted every day), and thus it takes a long time to be recommended. Furthermore, since the special program and the like have fewer broadcasting opportunity than the program broadcasted every day, the affect of when the viewing of the program is missed once is large.

In the device described in Japanese Patent Application Laid-Open No. 2004-343321, the program that does not match a specific keyword may not be recommended although it is a program to be recommended to the user.

In light of the foregoing, it is desirable to provide a novel and improved information processing apparatus and information processing method for recommending the broadcasting program according to the viewing history of the user, where the broadcasting program that matches the preference of the user is recommended regardless of the amount of broadcasting opportunity of the program.

According to an embodiment of the present invention, there is provided an image processing apparatus, including an EPG acquiring unit configured to acquire EPG (Electrical Program Guide) data related to a broadcasting program, a selecting unit configured to select a target program, which is a target specifying which broadcast pattern of a plurality of broadcast patterns of the broadcasting program classified by a predetermined criteria from the broadcasting program, a broadcast pattern specifying unit configured to specify a broadcast pattern of the target program using EPG data of a reference date, which is a broadcasting day of the target program, past EPG data within a predetermined number of days from the reference date, and future EPG data within a predetermined number of days from the reference date, and a preference information generation unit configured to generate preference information related to a broadcasting program subjected to weighting corresponding to the broadcast pattern of the broadcasting program based on viewing history information representing a viewing history of the broadcasting program and the broadcast pattern specified by the broadcast pattern specifying unit.

Therefore, in the present invention, the preference information is not generated merely by the viewing history, as in the related art, and the viewing history is weighted according to the broadcast pattern. Therefore, according to an embodiment of the present invention, the preference information that matches more to the preference of the user can be generated regardless of the amount of broadcasting opportunity of the program.

The preference information generation unit may weight viewing number of times of the broadcasting program calculated based on the viewing history information.

The preference information generation unit may include, a weighting coefficient setting unit configured to set a weighting coefficient used for weighting of the viewing number of times of the broadcasting program for every broadcast pattern, a preference value calculating unit configured to calculate a preference value in which the weighting coefficient set by the weighting coefficient setting unit is multiplied to the viewing number of times of the broadcasting program according to the broadcast pattern of the broadcasting program specified by the broadcast pattern specifying unit, and a weight processing unit configured to generate the preference information in which the viewing number of times is weighted based on the preference value.

The broadcast pattern specifying unit may include, a determining unit configured to determine whether or not the broadcasting program same as the target program for all the broadcasting programs broadcasted in a respective period of the past within the predetermined number of days, the future within the predetermined number of days, and the reference date, a number of program counting unit configured to count number of same programs, which is the broadcasting program same as the target program in the respective period of the past, the future, and the reference date according to the determination result of the determining unit, and a broadcast pattern extracting unit configured to extract the broadcast pattern based on the number of same programs in the past, the number of same programs in the future, and the number of same programs on the reference date.

The broadcast pattern may include, a first broadcast pattern in which two or more of the same programs exist in the past within the predetermined number of days or in the future within the predetermined number of days, a second broadcast pattern in which one same program exists in the past within the predetermined number of days or in the future within the predetermined number of days, a third broadcast pattern in which the same program does not exist in any of the past within the predetermined number of days, the future within the predetermined number of days, and the reference date, and a fourth broadcast pattern in which one or more of the same program exist on the reference date.

The broadcast pattern extracting unit, may specify the broadcast pattern of the target program as the first broadcast pattern when counted by the number of program counting unit that the number of same programs in the past within the predetermined number of days or the future within the predetermined number of days is two or more, may specify the broadcast pattern of the target program as the second broadcast pattern when counted by the number of program counting unit that the number of same programs in the past within the predetermined number of days or the future within the predetermined number of days is one, may specify the broadcast pattern of the target program as the third broadcast pattern when counted by the number of program counting unit that the number of same programs in the past within the predetermined number of days, the future within the predetermined number of days, and the reference date is zero, and may specify the broadcast pattern of the target program as the fourth broadcast pattern when counted by the number of program counting unit that the number of same programs on the reference date is one or more.

The selecting unit may select a target program, which is a target for determining whether a special program (A) broadcasted only once within a predetermined period or (B) broadcasted two or more times within a predetermined period, but a broadcast time length for only one specific broadcast is longer than a broadcast time length of other broadcasts, and the broadcast time length of one specific broadcast is longer than a predetermined broadcast time length of a plurality of broadcast patterns of the broadcasting program classified by a predetermined criteria from the broadcasting program.

Therefore, in the present invention, the special program (e.g., broadcasting program not containing information that matches keyword set by the user or keyword in the device), which may not be specified in the related art, can be found by having the broadcast pattern specifying unit specify the special program from the broadcast pattern using the EPG data. Since the viewing history and the like of the user is not depended on, a long period is not required until the selection and viewing of the program of a specific type by the user are facilitated even with respect to programs with few broadcasting opportunity such as the special program. With respect to the broadcasting program determined as the special program by the broadcast pattern specifying unit, the viewing opportunity by the user of the broadcasting program can be increased by having the display control unit perform a display indicating that it is a special program.

The information processing apparatus may further include a display control unit configured to cause a display device to display a display indicating that the target program determined as the special program by the broadcast pattern specifying unit is the special program.

The display control unit may cause the display device to display a list of special programs.

The display control unit may add display data indicating that the target program is the special program to the EPG data acquired by the EPG acquiring unit, and causes the display device to display the EPG data added with the display data.

The display control unit may cause the display device to display, at a time point a channel broadcasting one broadcasting program is switched to a channel broadcasting another broadcasting program determined as the special program, a display indicating that another program is the special program.

The broadcast pattern specifying unit may include, a same program determining unit configured to determine whether the broadcasting program same as the target program for all the broadcasting programs broadcasted in the past within the predetermined number of days, the reference date, and the future within the predetermined number of days, a number of program counting unit configured to count the number of same programs, which is the broadcasting program same as the target program in the past, the reference date, and the future according to the determination result of the same program determining unit, a broadcast time length determining unit configured to determine, when determined that a comparative program, which is the broadcasting program of comparison target of the target program is the broadcasting program same as the target program in the determination by the same program determining unit, whether a broadcast time length of the target program is longer than a broadcast time length of the comparative program and determining whether the broadcast time length of the target program is longer than a minimum broadcast time length of the special program set in advance, and a special program determining unit configured to determine whether or not a broadcast pattern of the target program is the special program according to the number of same programs by the number of program counting unit or the determination result of the broadcast time length determining unit.

The special program determining unit may determine that the broadcast pattern of the target program is the special program when (P) counted that the number of same programs is zero by the number of program counting unit or (Q) determined that the broadcast time length of the target program is longer than the broadcast time length of the comparative program and the broadcast time length of the target program is longer than the minimum broadcast time length.

According to another embodiment of the present invention, there is provided an information processing method comprising the steps of acquiring EPG data related to a broadcasting program, selecting a target program, which is a target specifying which broadcast pattern of a plurality of broadcast patterns of the broadcasting program classified by a predetermined criteria from the broadcasting program, specifying a broadcast pattern of the target program using EPG data of a reference date, which is a broadcasting day of the target program, EPG data before a previous day of the reference date and EPG data after a following day of the reference date, and generating preference information related to a broadcasting program subjected to weighting corresponding to the broadcast pattern of the broadcasting program based on viewing history information representing a viewing history of the broadcasting program and the broadcast pattern specified by the broadcast pattern specifying unit.

According to the embodiments of the present invention described above, the broadcasting program that matches more to the preference of the user can be recommended regardless of the amount of broadcasting opportunity of the program by weighting the viewing history of the user according to the broadcast pattern of the program in an information processing apparatus and an information processing method for recommending the broadcasting program according to the viewing history of the user.

BRIEF DESCRIPTION OF THE DRAWINGS

FIGS. 2A-2D illustrate an explanatory view showing examples of broadcast patterns according to the embodiment;

FIGS. 13A-13E illustrate an explanatory view showing examples of broadcast patterns according to the embodiment;

FIG. 19 is an explanatory view showing another example of the display method of the special program display by the display control unit according to the embodiment; and FIG. 20 is an explanatory view showing another further example of the display method of the special program display by the display control unit according to the embodiment.

DETAILED DESCRIPTION OF EMBODIMENT

Figure 1:
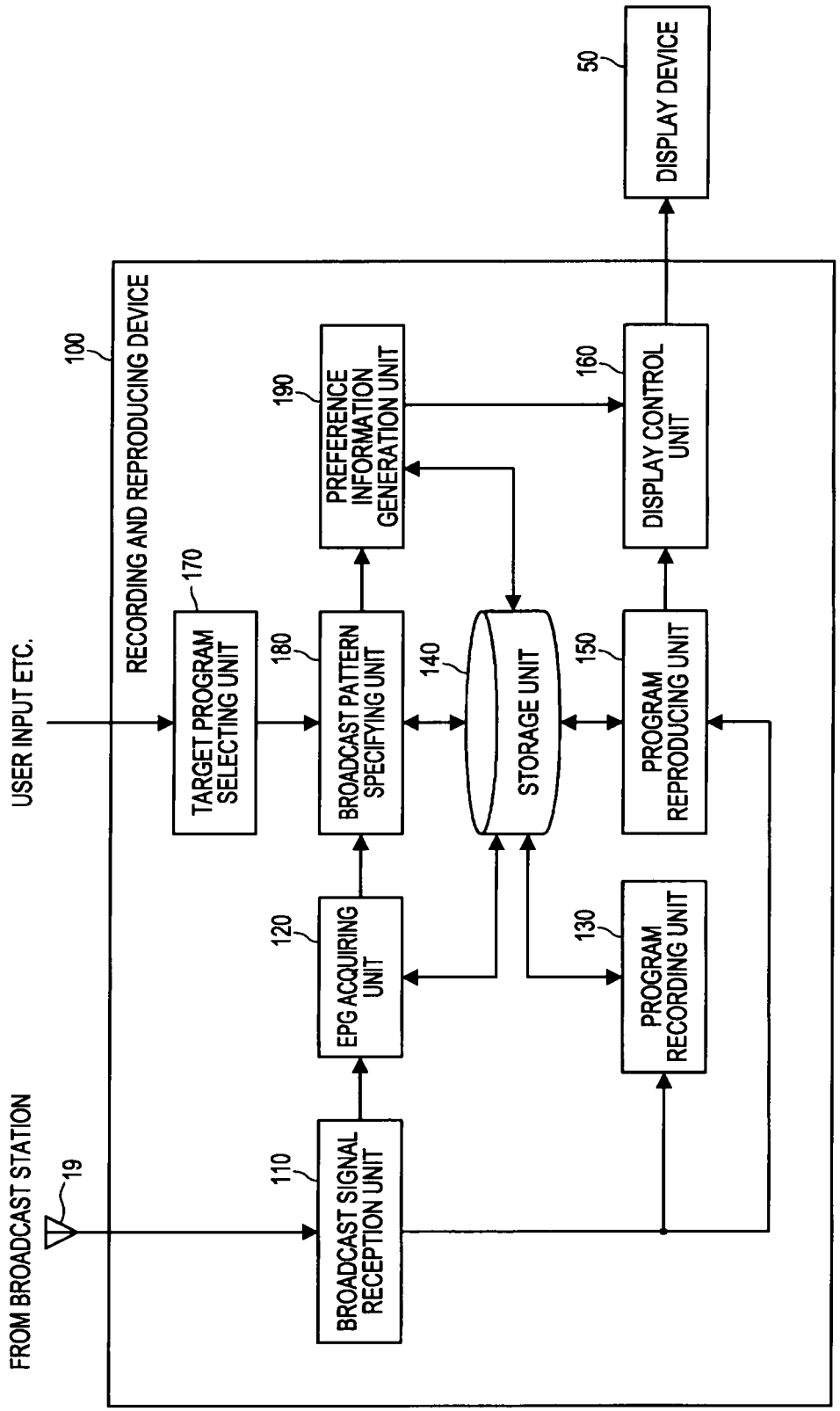
FIG. 1 is a block diagram showing one example of a function configuration of an information processing apparatus according to a first embodiment of the present invention.

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

(Configuration of Information Processing Apparatus According to First Embodiment of the Present Invention)
<Regarding Function Configuration>

First, the function configuration of an information processing apparatus according to one embodiment of the present invention will be described with reference to FIG. 1. FIG. 1 is a block diagram showing a function configuration of a recording and reproducing device 100 serving as an example of the information processing apparatus according to one embodiment of the present invention.

The recording and reproducing device 100 is a device capable of receiving a broadcast signal transmitted from a broadcast station and reproducing the broadcasting program and displaying on a display device (not shown) based on the received broadcast signal, and recording the broadcasting program on a recording medium based on the received broadcast signal. Specifically, as shown in FIG. 1, the recording and reproducing device 100 mainly includes a broadcast signal reception unit 110, a EPG acquiring unit 120, a program recording unit 130, a storage unit 140, a target program selecting unit 150, a broadcast pattern specifying unit 160, a preference information generation unit 170, a reproduction unit 180, and a display control unit 190.

The broadcast signal reception unit 110 receives a broadcast signal such as a television broadcast signal transmitted from a broadcast station through an antenna 19. The broadcast signal reception unit 110 includes a tuner (not shown) and can receive the broadcasting program for every channel. The television broadcast may be a terrestrial analog broadcast, terrestrial digital broadcast, BS analog broadcast, BS digital broadcast, and other wired broadcast and satellite broadcast.

The EPG acquiring unit 120 acquires EPG (Electrical Program Guide) data related to the broadcasting program transmitted from the broadcast station with the broadcast signal received by the broadcast signal reception unit 110. The EPG data includes information such as title of the broadcasting program, broadcast date, broadcasting channel, broadcasting start time, broadcast end time, genre of program, and the like. The EPG acquiring unit 120 stores the acquired EPG data in the storage unit 140.

The program recording unit 130 records the broadcasting program to be broadcasted based on the broadcast signal received by the broadcast signal reception unit 110 in the storage unit 140 according to user input and the like. Specifically, the program recording unit 130 decodes the broadcast signal received by the broadcast signal reception unit 110 with an NTSC (National Television System Committee) decoder and the like, and then encodes with an MPEG (Moving Picture Experts Group) method and the like. The program recording unit 130 then stores the encoded broadcast signal in the storage unit 140.

The storage unit 140 stores the EPG data acquired by the EPG acquiring unit 120, the broadcasting program recorded by the program recording unit 130, and the like. In addition to the EPG data and the broadcasting program, the storage unit 140 may store information related to the programmed recording of the program, and arbitrary information such as ID for specifying a device of the recording and reproducing device 100. The storage unit 140 may be an arbitrary recording medium such as a magnetic disc such as hard disc, an optical disc such as CD (Compact Disk), DVD (Digital Versatile Disk), and BD (Blu-ray Disk (registered trademark)), a magneto-optical disk, a semiconductor memory, a dielectric memory, and a tape recording medium.

The reproduction unit 150 reproduces the broadcasting program corresponding to the broadcast signal received by the broadcast signal reception unit 110 or the broadcast signal stored in the storage unit 140 according to user input and the like. Specifically, when directly reproducing (reproduce live broadcast) the broadcast signal received by the broadcast signal reception unit 110, the reproduction unit 150 decodes the broadcast signal received by the broadcast signal reception unit 110 with the NTSC decoder and the like, and transmits the decoded broadcast signal to the display control unit 160. When reproducing the broadcast signal stored in the storage unit 140, the reproduction unit 150 decodes the broadcast signal stored in the storage unit 140 with the decoder of the MPEG method and the like, and transmits the decoded broadcast signal to the display control unit 160.

The display control unit 160 D/A converts the broadcast signal transmitted from the reproduction unit 150, and controls the display device 50 connected to the recording and reproducing device 100 to output the video and the audio based on the D/A converted broadcast signal. The display device 50 may be a separate body from the recording and reproducing device 100 as in the present embodiment, or may be a device in which the display device 50 and the recording and reproducing device 100 are physically integrated.

The target program selecting unit 170 selects a target program according to the operation input of the user and the like. The "target program" refers to the broadcasting program, which is a target of specifying to which broadcast pattern of the plurality of broadcast patterns of the broadcasting program classified by a predetermined reference it corresponds from a plurality of broadcasting programs corresponding to the broadcast signal transmitted from the broadcast station. Specifically, when selecting the broadcasting program to be the target of programmed recording if the user attempts to perform programmed recording, or when the user changes the channel to select and view the broadcasting program of a different channel, the target program selecting unit 170 selects the broadcasting program to be the target of programmed recording or the broadcasting program of a different channel as the target program according to the signal of the operation request of the programmed recording, the display request of a different channel, and the like from the input unit (not shown).

The broadcast pattern specifying unit 180 uses the EPG data of a reference date which is a broadcast date of the target program, the past EPG data within a predetermined number of days from the reference date, and the future EPG data within a predetermined number of days from the reference date to specify the broadcast pattern of the target program. In this case, the broadcast pattern specifying unit 180 acquires from the target program selecting unit 170 the information indicating which broadcasting program is the target program (e.g., information on title of the broadcasting program and broadcast time slot). The broadcast pattern specifying unit 180 acquires the EPG data of the reference date and the future from the EPG data acquiring unit 120 and extracts the past EPG data from the storage unit 140.

Here, the "broadcast pattern" refers to a broadcasting mode of the broadcasting program such as the frequency the broadcasting program is broadcasted or the period the broadcasting program is broadcasted, and mainly includes the following four patterns.

(1) First broadcast pattern: Pattern in which the two or more of the same programs exist in the past within a predetermined number of days (e.g., one week) or in the future within a predetermined number of days (e.g., one week).

(2) Second pattern: Pattern in which one same program exists in the past within a predetermined number of days (e.g., one week) or in the future within a predetermined number of days (e.g., one week).

(3) Third broadcast pattern: Pattern in which the same program does not exist in any of the past within a predetermined number of days (e.g., one week), in the future within a predetermined number of days (e.g., one week) or the reference date.

(4) Fourth broadcast pattern: Pattern in which one or more of the same program exist on the reference date.

The specific examples of such broadcast patterns will be described in detail with reference to FIG. 2. FIG. 2 is an explanatory view showing one example of the broadcast pattern according to the present embodiment. In the example of FIG. 2, since the data for one week from the day the EPG data is acquired is often transmitted in the usual EPG data, the predetermined number of days in the first to the fourth broadcast patterns is set as one week. In FIGS. 2A to 2D, the horizontal direction shows the broadcasting day and the vertical direction shows the broadcast time slot, which broadcasting time band is further classified into morning, afternoon, night, and late night. In FIG. 2, the time slot of "morning" is from 5:00 to 11:00, the time slot of "afternoon" is from 11:00 to 17:00, the time slot of "night" is from 17:00 to 23:00, and the time slot of "late night" is after 23:00, but this is set for the sake of convenience, and the time slots of morning, afternoon, night, and late night are not limited thereto and may be appropriately set. Furthermore, in FIG. 2, the day of the week corresponding to the reference date is circled, the target program is shown with a black rectangle, and the program (hereinafter referred to as "comparative program") that becomes the comparison target of determining whether or not the same program as the target program is shown with an outlined rectangle. The length in the vertical direction of the target program and the comparative program shows the broadcasting tine length.

As shown in FIG. 2, assuming the predetermined number of days is one week, four types of broadcast pattern of (a) daily pattern corresponding to the first broadcast pattern, (b) weekly pattern corresponding to the second broadcast pattern, (c) special program pattern corresponding to the third broadcast pattern, and (d) continuous pattern corresponding to the fourth broadcast pattern are provided.

The (a) daily pattern is the broadcast pattern of the program broadcasted in a constant time slot (in FIG. 2, 12:00 to 13:00) from Monday to Friday. The broadcast pattern specifying unit 180 uses the EPG for the past one week and the EPG for the future one week with the reference date (Monday in FIG. 2), which is the broadcasting day of the target program, as the reference point, to examine whether the program same as the target program exists in the past one week and in the future one week. If the number of programs same as the target program of the comparative program broadcasted in past one week is two or more or if the number of programs same as the target program of the comparative program to be broadcasted in the future one week is two or more, the broadcast pattern specifying unit 180 specifies the broadcast pattern of the target program as (a) daily pattern.

The (b) weekly pattern is the broadcast pattern of the program broadcasted in a constant time slot (in FIG. 2, 23:15 to 24:15 of Tuesday) of a certain day of the week every week. The broadcast pattern specifying unit 180 uses the EPG for the past one week and the EPG for the future one week with the reference date (Tuesday in FIG. 2) as the reference point to examine whether the program same as the target program exists in the past one week and in the future one week. If the number of programs same as the target program of the comparative program broadcasted in the past one week is only one or if the number of programs same as the target program of the comparative program to be broadcasted in the future one week is only one, the broadcast pattern specifying unit 180 specifies the broadcast pattern of the target program as (b) weekly pattern.

The (c) special program pattern is the broadcast pattern of the program (so-called special program) specially broadcasted during a certain time of year (end of year and beginning of new year, summer period, etc.) every year or broadcasted only during the program changing period, the program (e.g., one-story two hour drama etc.) broadcasted irregularly, and the like. The broadcast pattern specifying unit 180 uses the EPG of the reference date, the EPG for the past one week and the EPG for the future one week with the reference date (Saturday in FIG. 2) as the reference point to examine whether the program same as the target program exists on the same day as the reference date, in the past one week and in the future one week. If the program same as the target program does not exist in the comparative program broadcasted on the reference date, in past one week or in future one week (number of programs same as target number is zero), the broadcast pattern specifying unit 180 specifies the broadcast pattern of the target program as (c) special program pattern.

The (d) continuous pattern is the broadcast pattern of the program in which plural stories are continuously broadcasted on the same day (in FIG. 2, three stories of 11:00 to 12:00, 12:00 to 13:00, 13:00 to 14:00 on Saturday). The broadcast pattern specifying unit 180 uses the EPG data of the reference date with the reference date (Saturday in FIG. 2) as the reference point to examine whether the program same as the target program exists on the same day as the reference date. If one or more programs same as the target program exist in the comparative program broadcasted on the reference date, the broadcast pattern specifying unit 180 specifies the broadcast pattern of the target program as (d) continuous pattern.

Figure 3:
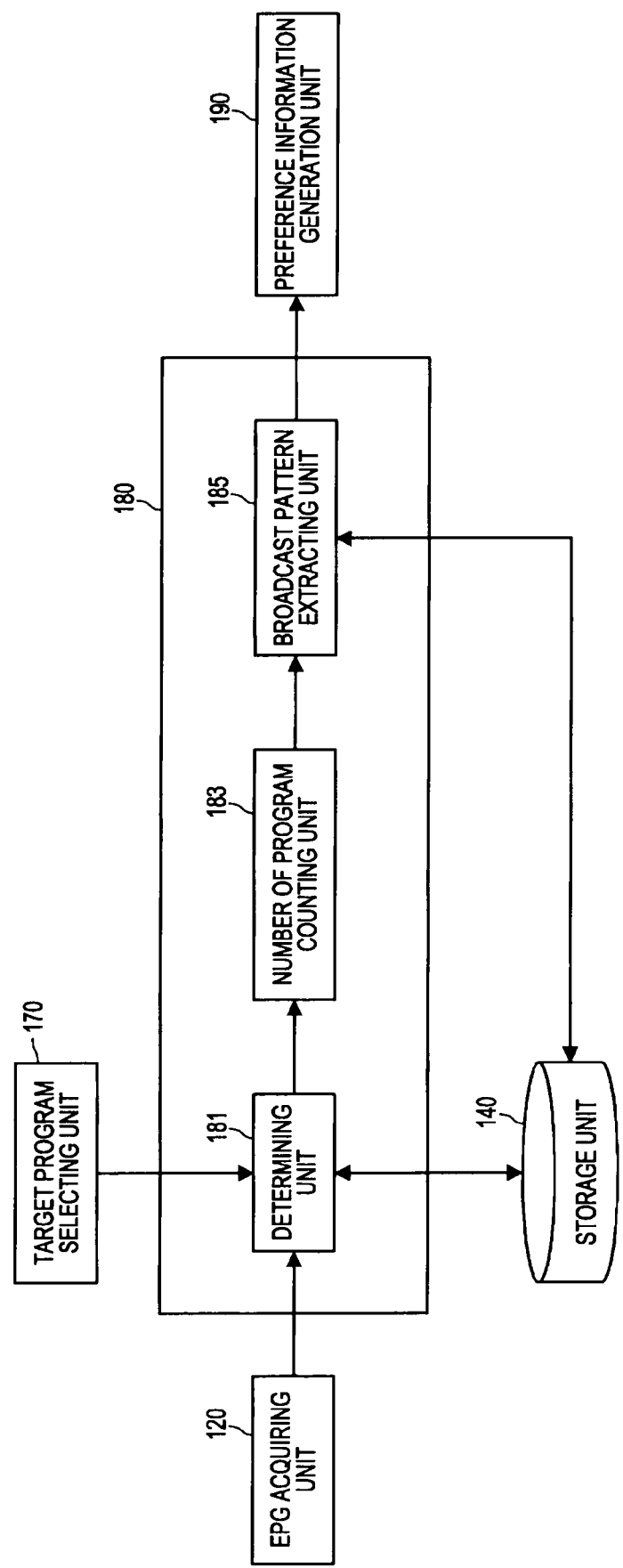
FIG. 3 is a block diagram showing a function configuration of a broadcast pattern specifying unit according to the embodiment.

The detailed function configuration of the broadcast pattern specifying unit 180 according to the present embodiment for specifying the broadcast pattern will now be described with reference to FIG. 3. FIG. 3 is a block diagram showing the function configuration of the broadcast pattern specifying unit 180 according to the present embodiment.

As shown in FIG. 3, the broadcast pattern specifying unit 180 mainly includes a determining unit 181, a number of program counting unit 183, and a broadcast pattern extracting unit 185.

The determining unit 181 determines whether or not a broadcasting program is the same as the target program for all the broadcasting programs (comparative programs) broadcasted in a respective period of in the past within a predetermined number of days (e.g., past one week), in the future within a predetermined number of days (e.g., future one week) and the reference date. More specifically, the determining unit 181 acquires from the target program selecting unit 170 the information showing which broadcasting program is the target program (e.g., information on title of the broadcasting program, broadcast time slot etc.), extracts the EPG data of the past from the storage unit 140, and acquires the EPG data of the reference date and the future from the EPG acquiring unit 120. The determining unit 181 then determines, for all the broadcasting programs broadcasted in the past, on the reference date, and in the future, based on the acquired information, whether the comparative program broadcasted in the past and the target program are the same, whether the comparative program to be broadcasted in the future and the target program are the same, and whether the comparative program broadcasted on the day same as the reference date and the target program are the same. The determining unit 181 then notifies the number of program counting unit 183 of the results of the determination.

The number of program counting unit 183 counts the number of same programs which is the broadcasting program same as the target program in the respective period of the past, the future, and the reference date according to the determination result of the determining unit 181. Specifically, the number of program counting unit 183 increases the number of counts of the same program by one every time determination is made that the comparative program and the target program are the same as a result of the determination by the determining unit 181. The counting of the same program is independently performed each of the past, the future, and the same day as the reference date. The number of program counting unit 183 notifies the broadcast pattern extracting unit 185 of the counted number of same programs for each of the past, the future, and the same day as the reference date.

The broadcast pattern extracting unit 185 extracts the broadcast pattern of the target program based on the number of same programs in the past, the number of same programs in the future, and the number of same programs on the reference date notified from the number of program counting unit 183. For instance, describing the case where the broadcast pattern is classified into the first to the fourth broadcast patterns described above, the broadcast pattern extracting unit 185 first specifies the broadcast pattern of the target program as the first broadcast pattern if the number of same programs in the past within a predetermined number of days or in the future within a predetermined number of days is counted as two or more by the number of program counting unit 183. Secondly, the broadcast pattern extracting unit 185 specifies the broadcast pattern of the target program as the second broadcast pattern if the number of same programs in the past within a predetermined number of days or in the future within a predetermined number of days is counted as one by the number of program counting unit 183. Thirdly, the broadcast pattern extracting unit 185 specifies the broadcast pattern of the target program as the third broadcast pattern if the number of same programs in the past within a predetermined number of days, in the future within a predetermined number of days, and on the reference date is counted as zero by the number of program counting unit 183. Fourthly, the broadcast pattern extracting unit 185 specifies the broadcast pattern of the target program as the fourth broadcast pattern if the number of same programs on the reference date is counted as one or more by the number of program counting unit 183.

The broadcast pattern extracting unit 183 also notifies the preference information generation unit 190 of the specified broadcast pattern of the target program. The broadcast pattern extracting unit 183 may record the specified broadcast pattern of the target program in the storage unit 140.

The description on the function configuration of the recording and reproducing device 100 will now be continued with reference again to FIG. 1.

The preference information generation unit 190 generates the preference information related to the broadcasting program weighted according to the broadcast pattern of the broadcasting program based on the viewing history information showing the viewing history of the broadcasting program and the broadcast pattern specified by the broadcast pattern specifying unit 180.

Here, the "viewing history information" refers to the supplementary information related to the broadcasting program itself the viewer viewed in the past, the information on the viewing mode, and the like, and includes, information related to the program name, the viewing date, the viewing time slot, and the like of the broadcasting program the viewer viewed in the past. The "preference information" refers to the information showing the preference of the user with respect to each broadcasting program. Furthermore, the "weighting according to the broadcast pattern" refers to the weighting with respect to the viewing history of the user performed with a degree defined for each of the first to the fourth broadcast patterns, where the preference information generation unit 190 performs weighting on the viewing number of times of the broadcasting program calculated based on the viewing history information according to the broadcast pattern specified by the broadcast pattern specifying unit 180.

Figure 4:
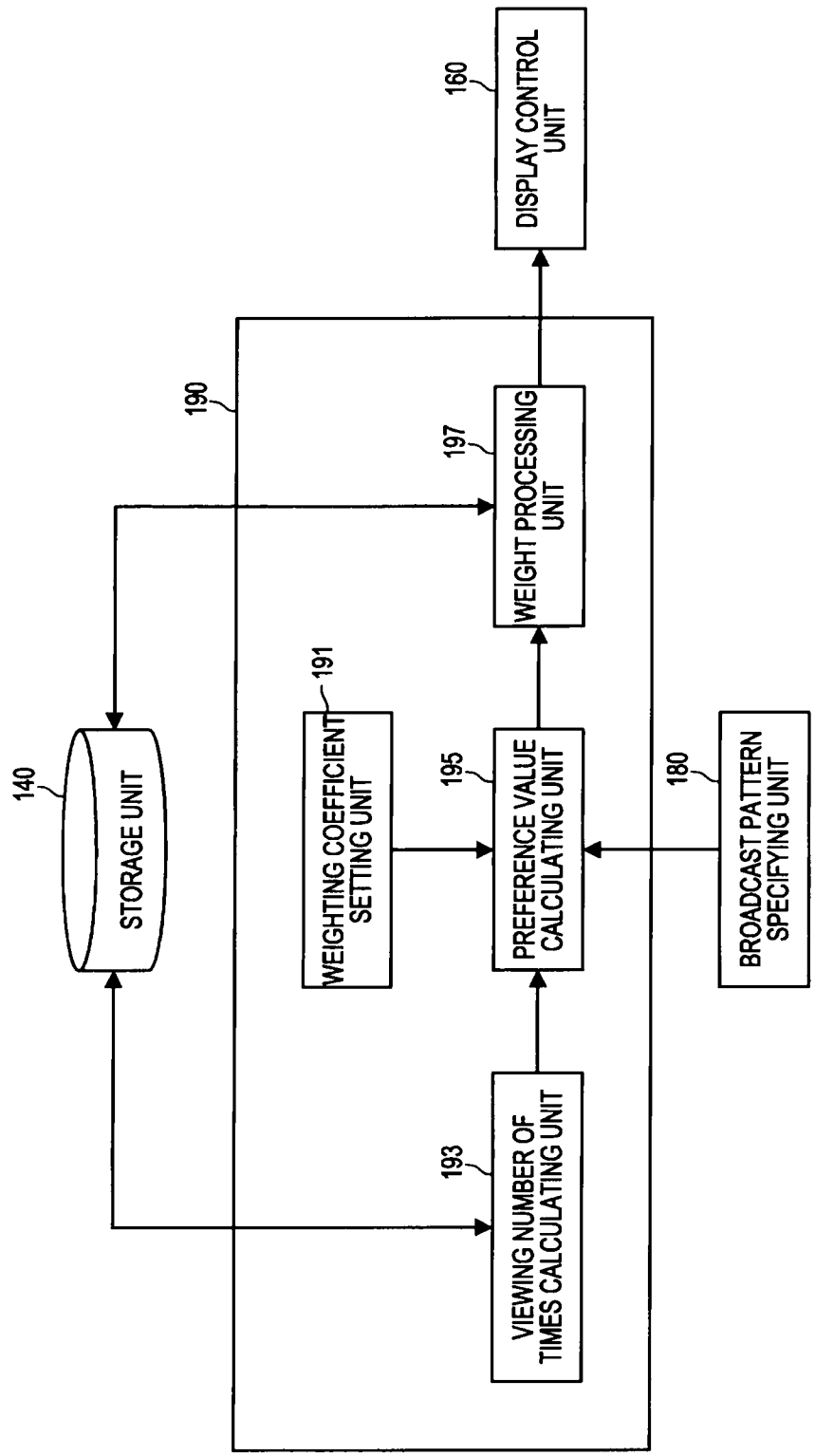
FIG. 4 is a block diagram showing a function configuration of a preference information generation unit according to the embodiment.

The more detailed function configuration example of the preference information generation unit 190 will be described with reference to FIG. 4. FIG. 4 is a block diagram showing a function configuration of the preference information generation unit 190 according to the present embodiment.

As shown in FIG. 4, the preference information generation unit 190 mainly includes a weighting coefficient setting unit 191, a viewing number of times calculating unit 193, a preference value calculating unit 195, and a weight processing unit 197.

The weighting coefficient setting unit 191 sets the weighting coefficient used in the weighting of the viewing number of times of the broadcasting program for every broadcast pattern. The weighting coefficient setting unit 191 can set a large weighting coefficient for the broadcast pattern of the program with few broadcasting opportunity, and set a small weighting coefficient for the broadcast pattern of the program with many broadcasting opportunity. In the examples of the first to the fourth broadcast patterns, the weighting coefficient setting unit 191 sets the weighting coefficient of the first broadcast pattern (e.g., (a) daily pattern) to 1, the weighting coefficient of the second broadcast pattern (e.g., (b) weekly pattern) to 5, the weighting coefficient of the third broadcast pattern (e.g., (c) special program pattern) to 60, and the weighting coefficient of the fourth broadcast pattern (e.g., (d) continuous pattern) to 1. By setting the weighting coefficient in such manner, when the program of the third broadcast pattern with few broadcasting opportunity is merely viewed once, this is handled similar to when the program of the first broadcast pattern of many broadcasting opportunity is viewed 60 times from the standpoint of the viewing history. The weighting coefficient setting unit 191 provides the set weighting coefficient to the preference value calculating unit 195.

The viewing number of times calculating unit 193 calculates the past viewing number of times by the user of each broadcasting program based on the viewing history information stored in the storage unit 140. Specifically, the viewing number of times calculating unit 193 calculates the past viewing number of times of the user for each broadcasting program from the information such as the program name and the viewing day of the broadcasting program the user viewed in the past stored in the storage unit 140. The viewing number of times calculating unit 193 provides the information related to the calculated viewing number of times of the broadcasting program to the preference value calculating unit 195.

The preference value calculating unit 195 calculates the preference value obtained by multiplying the viewing number of times of the broadcasting program calculated by the viewing number of times calculating unit 193 on the weighting coefficient set by the weighting coefficient setting unit 191 according to the broadcast pattern of the broadcasting program specified by the broadcast pattern specifying unit 180.

For instance, assume that the past viewing number of times by the user of programs A, B, C is 10 times, one time, and 40 times for when the broadcast pattern of the program A is (b) weekly pattern, the broadcast pattern of the program B is (c) special program pattern, and the broadcast pattern of the program C is (a) daily pattern. The preference values of the programs A, B, C are respectively 50(=10×5), 60(=1×60), 40(=40×1).

The weight processing unit 197 generates the preference information in which the viewing number of times is weighted based on the preference value calculated by the preference value calculating unit 195. Describing the specific example in the above example, the preference values of the programs A, B, C calculated by the preference value calculating unit 195 are 50, 60, 40, and thus program B> program A> program C is obtained for the preference of the user, and the information representing the degree of preference of the user is generated as the preference information in which the viewing number of times is weighted for every broadcast pattern without simply depending on the viewing number of times. The weight processing unit 197 of the preference information generation unit 190 may provide the generated preference information to the display control unit 160. Thus, the display control unit 160 can cause the display device 50 to display the recommended broadcasting program to the user based on the provided preference information. Although not shown, if the recording and reproducing device 100 has a programmed recording function, the weight processing unit 197 of the preference information generation unit 190 may provide the preference information to the programmed recording function, and the recording and reproducing device 100 can automatically record the broadcasting program recommended to the user.

According to the preference information generation unit 190 according to the present embodiment, since the viewing history (viewing number of times) is weighted according to the broadcast pattern of the broadcasting program specified by the broadcast pattern specifying unit 180, the preference of the user is not influenced by the amount of broadcasting opportunity of the broadcasting program, and the preference information that more accurately matches the preference of the user can be generated. Therefore, the broadcasting program that more matches the preference of the user can be recommended regardless of the amount of broadcasting opportunity of the program by recommending the broadcasting program to the user using the preference information generated in the above manner. In other words, in the related art, the preference information is created based only on the viewing history (in particular, viewing number of times), and thus the broadcast time with few broadcasting opportunity takes time until the viewing number of times is accumulated, whereby a long time is required until the relevant program is recommended. However, according to the preference information generated by the preference information generation unit 190 according to the present embodiment, the preference value of the user is high even if the viewing number of times is few since high weighting coefficient is set to the broadcasting program with few broadcasting opportunity. Thus, the broadcasting program that more matches the preference of the user can be recommended regardless of the amount of broadcasting opportunity of the program.

The manner of recommending the broadcasting program to the user is not particularly limited and includes displaying a list of recommended broadcasting programs on the display device 50, displaying in a recognizable manner to the user that it is recommended in the field of programs to be recommended to the user on the EPG, and displaying in a recognizable manner to the user that when the user changes the channel, the program broadcasted on such channel is recommended on the display screen of the display device 50. In addition, the recommended broadcasting program may be automatically recorded and the display notifying such recording may be made on the display device 50, or the display of the recommended program may be made on the display screen before a predetermined time from the start of broadcasting of the recommended broadcasting program.

FIGS. 1 to 4 described above show configuration examples of the functions realized when the CPU (see FIG. 5) executes the program. Such functions may be realized by a different program, may be realized by a single program, or may be realized by hardware.

<Regarding Hardware Configuration>

Figure 5:
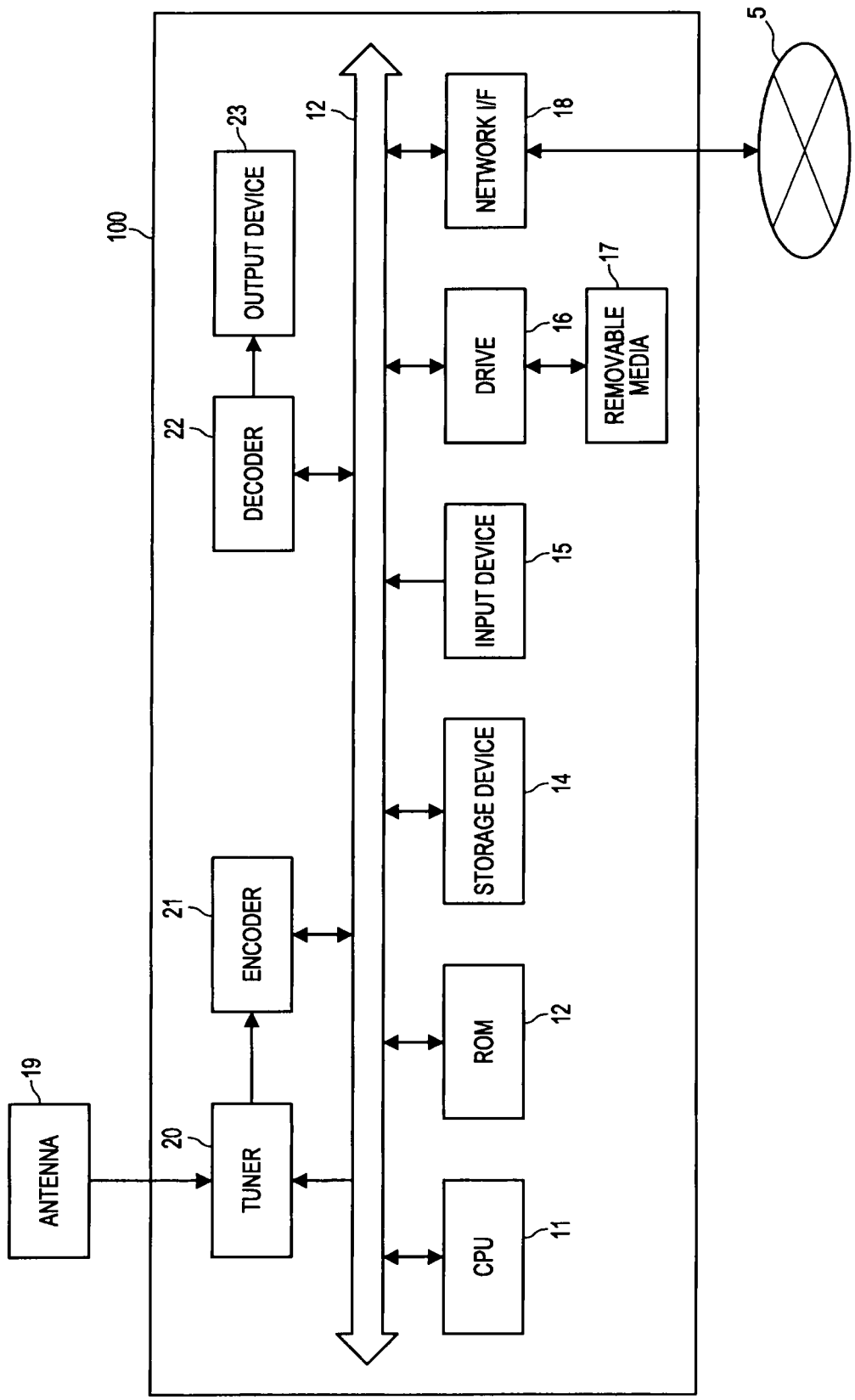
FIG. 5 is a block diagram showing a hardware configuration of the information processing apparatus according to the embodiment.

The hardware configuration of the information processing apparatus according to the present embodiment for realizing the above-described functions will be described with reference to FIG. 5. FIG. 5 is a block diagram showing a hardware configuration of the recording and reproducing device 100 serving as an example of the information processing apparatus according to the present embodiment.

As shown in FIG. 5, the recording and reproducing device 100 is a device in which the CPU 11, the ROM (Read Only Memory) 13, a storage device 14, an input device 15, a drive 16, a network interface (I/F) 18, a tuner 20, an encoder 21, and a decoder 22 are connected by way of a bus 12.

The CPU 11 controls the process of the entire recording and reproducing device 100, and executes the program held in the ROM 13 to realize each of the above functions, where each function mutually acts to execute the search of the program, recordation and reproduction of the program, specification of the broadcast pattern, generation of the preference information, and the like.

The ROM 13 is connected to the CPU 11 through the bus 12, and stores programs for realizing each function above.

The storage device 14 includes a hard disc drive, a removable semiconductor memory, and the like, and records the coded data of the recorded program, the acquired EPG data, the program information of each program acquired from the EPG data, and the like.

The input device 15 includes a button arranged on the housing side surface etc. of the recording and reproducing device 100, a switch, a remote controller and a receiver. The input device 15 also includes a cursor button operated when moving the cursor and instructing the selecting target, and a determination button operated when performing the determination operation on the display screen of the display device (not shown).

The drive 16 is a device to which the removable media 17 can be inserted and discharged, where the data stored in the removable media 17 inserted to the drive 16 is read out and the data is written to the removable media 17.

The network I/F 18 is connected to an external device or the network 5 through the Ethernet (registered trademark), i.LINK (trademark), USB and the like. The network I/F 18 is connected to a predetermined server by way of the network 5, and acquires distribution schedule information (correspond to EPG data of the television broadcast) of the AV data, information related to the AV data (correspond to program information of the television broadcast), and the like in addition to acquiring the AV data.

The tuner 20 receives the television broadcast signal through the antenna 19 or the CATV network etc., extracts the video signal and the audio signal of the program to reproduce or record from the received broadcast signal and outputs the same to the encoder 21. The tuner 20 then extracts the EPG data from the television broadcast signal and outputs the same to the storage device 14 through the bus 12. When distributing the EPG data with a predetermined server on the Internet, the EPG data may be acquired from such server.

The encoder 21 codes the video signal and the audio signal of the program input from the tuner 20 using a coding method such as MPEG2 method and H.246/AVC method, and outputs the AV coded data of the coding result to the storage device 14 through the bus 12.

The decoder 22 decodes the AV coding data read out from the storage device 14 and input through the bus 12, and outputs the video signal and the audio signal of the decoding result to the output device 23. The encoder 21 and the decoder 22 may be realized by software. If the television broadcast signal is already coded as in the terrestrial digital broadcast and the BS digital broadcast, the data may be recorded in the coded state, or may be decoded by the decoder 22, and then again coded by the encoder 21 and recorded.

(Flow of Process of Information Processing Method According to the First Embodiment of The Present Invention)

Figure 6:
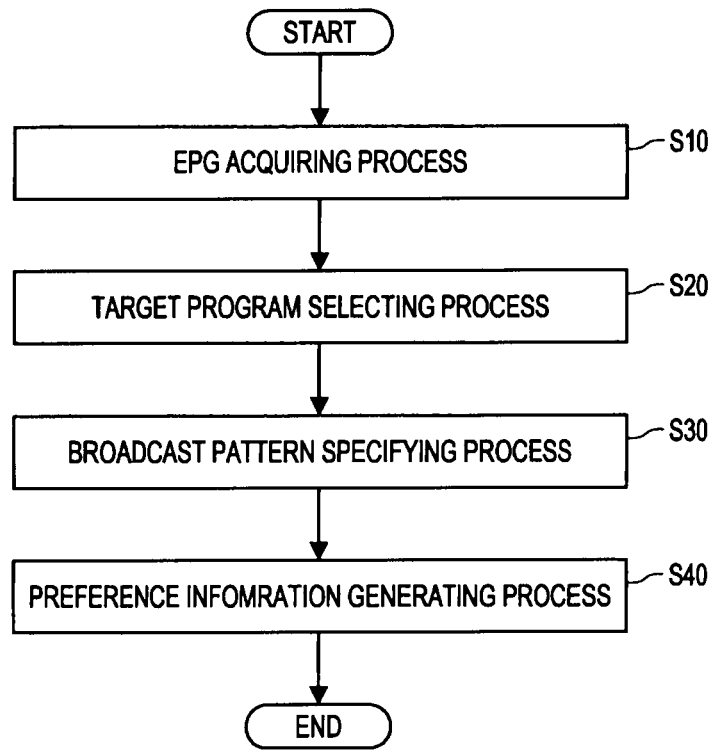
FIG. 6 is a flowchart showing the flow of the process of the entire information processing method according to the embodiment.

The recording and reproducing device 100 has been described by way of example for the configuration of the information processing apparatus according to the present embodiment, and now, the flow of the process in the information processing method according to the present embodiment using such information processing apparatus will be described with reference to FIG. 6. FIG. 6 is a flowchart showing the flow of the entire process of the information processing method according to the present embodiment.

As shown in FIG. 6, the information processing method according to the present embodiment includes an EPG acquiring process (S10), a target program selecting process (S20), a broadcast pattern specifying process (S30), and a preference information generating process (S40), which are executed in such order. The EPG acquiring process (S10) and the target program selecting process (S20) may not be in such order, and the EPG acquiring process may be executed after the target program selecting process, or both processes may be simultaneously executed. Each process will be described below.

The EPG acquiring process (S10) is a process the EPG acquiring unit 120 acquires the EPG (Electrical Program Guide) data related to the broadcasting program transmitted from the broadcast station with the broadcast signal received by the broadcast signal reception unit 110.

The target program selecting process (S20) is a process the target program selecting unit 170 selects the target program or the target specifying which broadcast pattern of a plurality of broadcast patterns of the broadcasting program classified by a predetermined reference from the broadcasting program according to the operation input etc. of the user. Specifically, when selecting the broadcasting program or the target of programmed recording when the user attempts to program record, or when the user changes the channel and selects and views the broadcasting program of a different channel, the target program selecting unit 170 selects the broadcasting program or the target of the programmed recording or the broadcasting program of a different channel as the target program according to the signal of the operation request of the programmed recording or the display request of a different channel from the input unit (not shown).

The broadcast pattern specifying process (S30) is a process the broadcast pattern specifying unit 180 specifies the broadcast pattern of the target program using the EPG data of the reference date or the broadcasting day of the target program, the past EPG data of before the previous day of the reference date, and the future EPG data of after the next day of the reference date.

Figure 7:
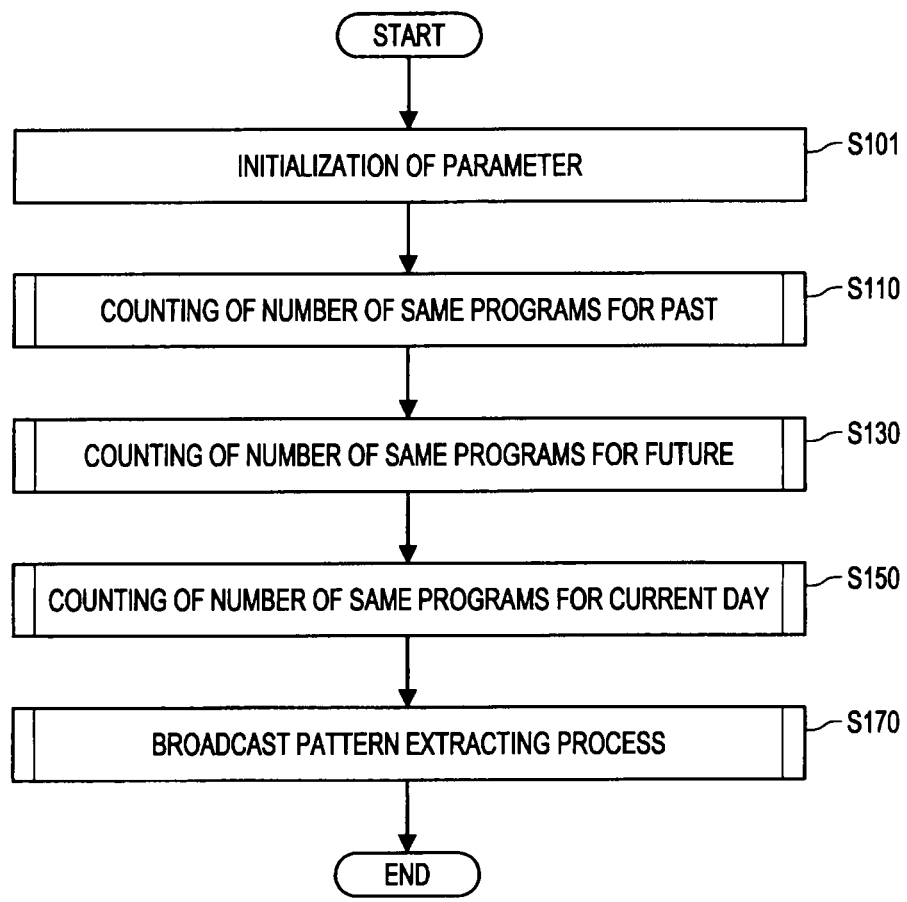
FIG. 7 is a flowchart showing the flow of the broadcast pattern specifying process according to embodiment.
Figure 8:
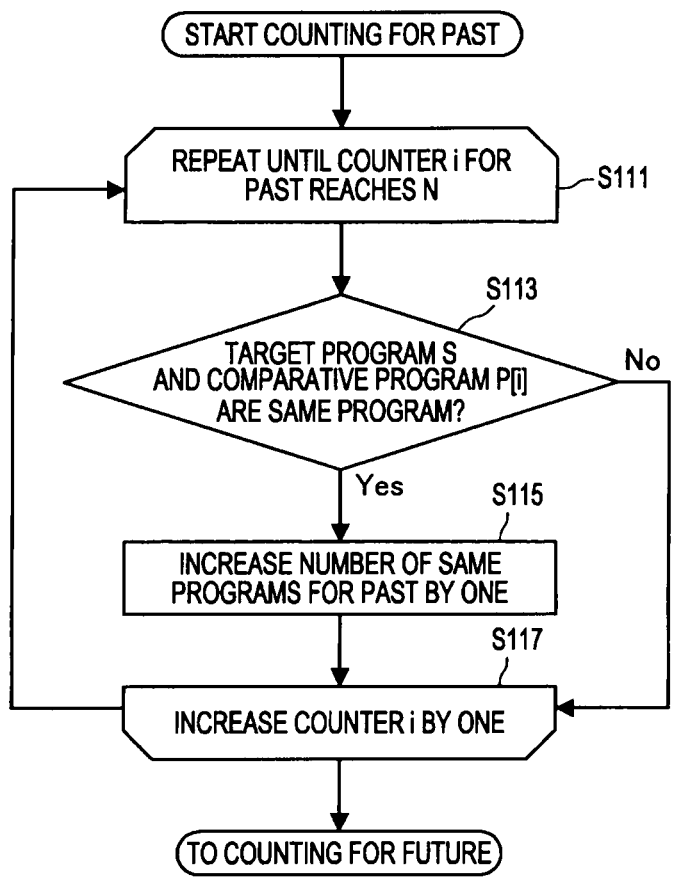
FIG. 8 is a flowchart showing the flow of the counting process of the number of same programs for the past shown in FIG. 7.
Figure 9:
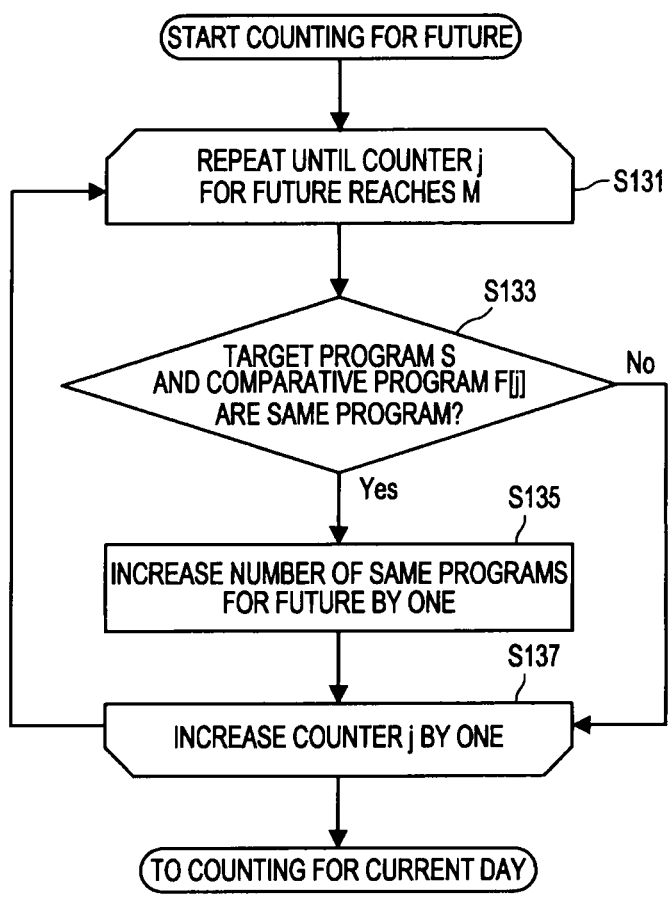
FIG. 9 is a flowchart showing the flow of the counting process of the number of same programs for the future shown in FIG. 7.
Figure 10:
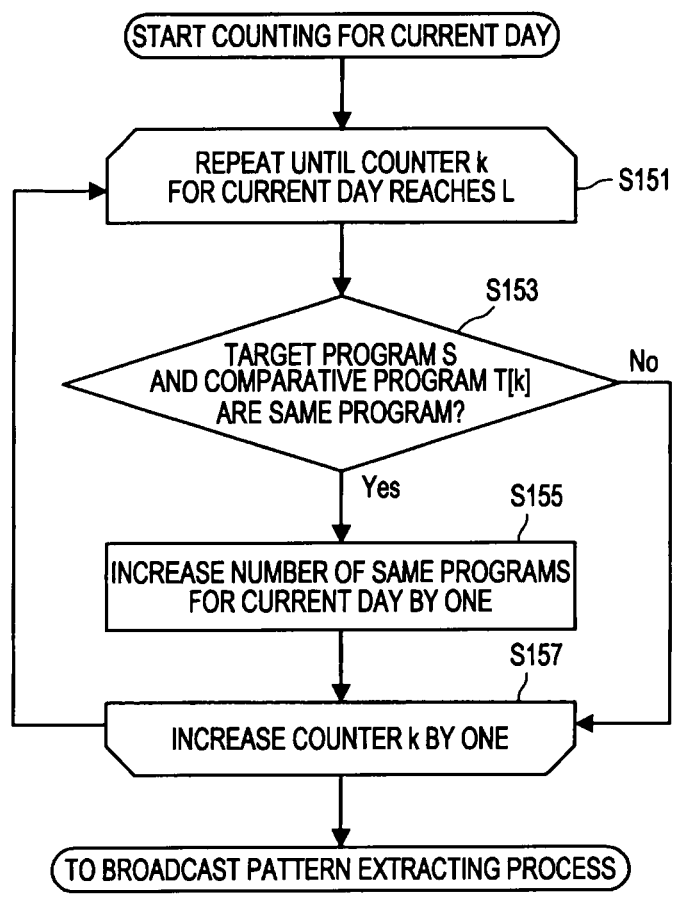
FIG. 10 is a flowchart showing the flow of the counting process of the number of same programs for the current day shown in FIG. 7.
Figure 11:
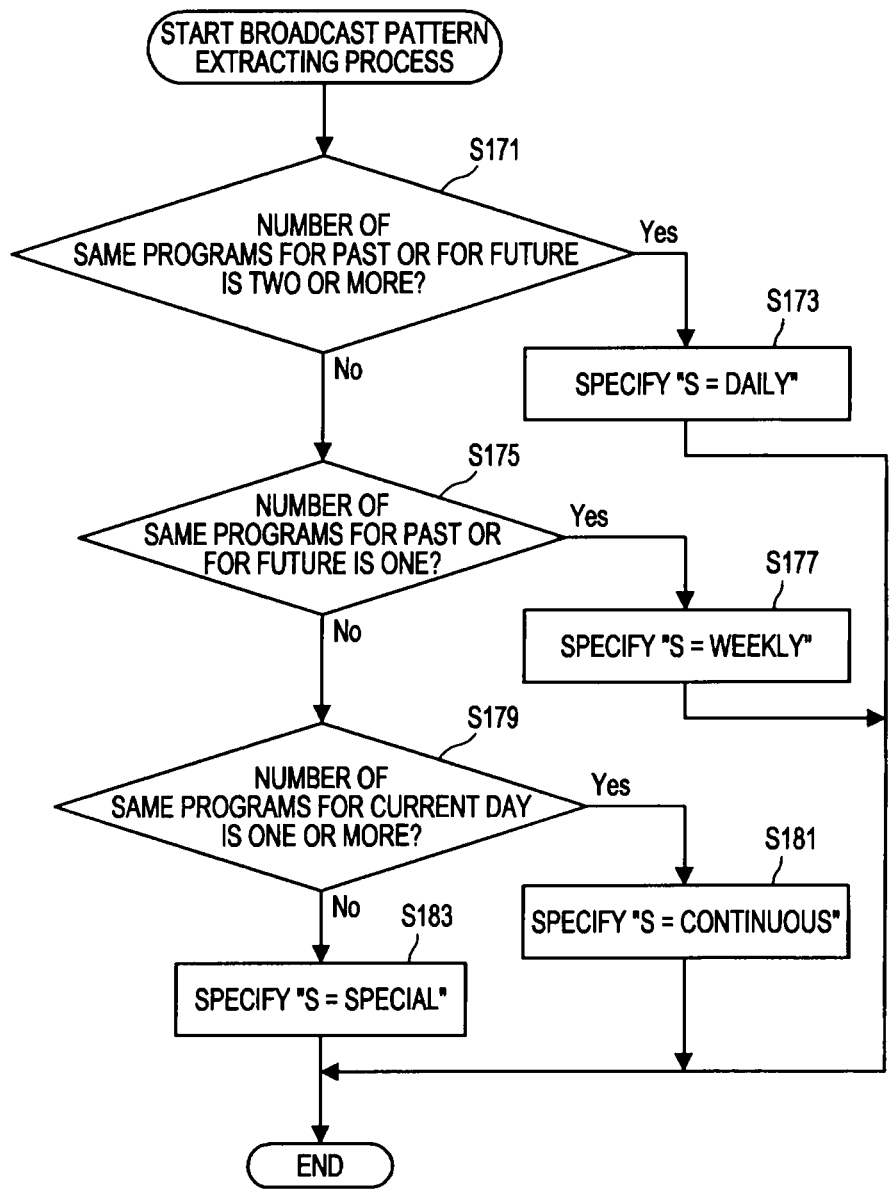
FIG. 11 is a flowchart showing the flow of the broadcast pattern extracting process shown in FIG. 7.

The flow of the broadcast pattern specifying process according to the present embodiment will be described in further detail with reference to FIGS. 7 to 11. FIG. 7 is a flowchart showing the flow of the broadcast pattern specifying process according to the present embodiment. FIGS. 8 to 10 are flowcharts showing the flow of the process of counting the number of same programs for the past, the future, and the current day shown in FIG. 7. FIG. 11 is a flowchart showing the flow of the broadcast pattern extracting process shown in FIG. 7. In FIGS. 7 to 11, a case in which the broadcast pattern is classified into four types of (a) daily pattern (daily), (b) weekly pattern (weekly), (c) special program pattern (special), and (d) continuous pattern (continuous), and the four types of broadcast patterns are specified using the EPG data for the past one week, for the reference date, and for the future one week is shown by way of example.

As shown in FIG. 7, the parameter is first initialized in the broadcast pattern specifying process (S101). Specifically, the number of programs same as the target program S in the programs broadcasted in the past one week, a counter i (hereinafter referred to as "counter for the past") for comparison of the program for the past one week and the target program S, the number of programs same as the target program S in the programs to be broadcasted in future one week, a counter j (hereinafter referred to as "counter for the future") for comparison of the program for the future one week and the target program S, the number of programs same as the target program S in the programs broadcasted on the current day (same day as reference date), and a counter k (hereinafter referred to as "counter for the current day") for comparison of the program for the current day and the target program S are respectively set to zero.

The counting of the number of programs same as the target program in the programs broadcasted in the past one week (S110), the counting of the number of programs same as the target program in the programs to be broadcasted in the future one week (S130), and the counting of the number of programs same as the target program in the programs broadcasted on the same day (current day) as the reference date (S150) are sequentially performed. Since the viewing history and the like of the user is not depended on, a long period is not required until the selection and viewing of the program of a specific type by the user are facilitated even with respect to programs with few broadcasting opportunity such as the special program. With respect to the broadcasting program determined as the special program by the broadcast pattern specifying unit 1180, the viewing opportunity by the user of the broadcasting program can be increased by having the display control unit 1190 perform a display indicating that it is a special program.

As shown in FIG. 8, the process of counting (hereinafter referred to as "counting for the past") the number of programs same as the target program in the programs broadcasted in the past one week is repeated until the counter i for the past reaches the number of programs N of the broadcasting program broadcasted in the past one week (S111). In this process, the determining unit 181 of the broadcast pattern specifying unit 180 first determines whether or not the past comparative program P[i], or the target of comparison for determining whether or not the program is the same as the target program S, and the target program S are the same program, based on the past EPG data extracted from the storage unit 140 (S113). If determined that the target program S and the comparative program P[i] are the same program as a result of the determination, the number of program counting unit 183 of the broadcast pattern specifying unit 180 increases the number of same programs for the past by one (S115), and increments the counter i by one (S117). If determined that the target program S and the comparative program P[i] are different programs as a result of the determination of step S113, the number of program counting unit 183 increments the counter i by one (S117). The series of processes of steps S113 to S117 are repeated until the counter i for the past reaches the number of programs N for the past, where the process proceeds to the next counting process (S130) when the counter i reaches N.

As shown in FIG. 9, the process of counting (hereinafter referred to as "counting for the future") the number of programs same as the target program in the programs to be broadcasted in the future one week is repeated until the counter j for the future reaches the number of programs M of the broadcasting program to be broadcasted in the future one week (S131). In this process, the determining unit 181 of the broadcast pattern specifying unit 180 first determines whether or not the future comparative program F[j], or the target of comparison for determining whether or not the program is the same as the target program S, and the target program S are the same program, based on the future EPG data extracted from the EPG acquiring unit 120 (S133). If determined that the target program S and the comparative program F[j] are the same program as a result of the determination, the number of program counting unit 183 of the broadcast pattern specifying unit 180 increases the number of same programs for the future by one (S135), and increments the counter j by one (S137). If determined that the target program S and the comparative program F[j] are different programs as a result of the determination of step S133, the number of program counting unit 183 increments the counter j by one (S137). The series of processes of steps S133 to S137 are repeated until the counter j for the future reaches the number of programs M for the future, where the process proceeds to the next counting process (S150) when the counter j reaches M.

As shown in FIG. 10, the process of counting (hereinafter referred to as "counting for the current day") the number of programs same as the target program in the programs broadcasted on the same day (current day) as the reference date is repeated until the counter k for the day reaches the number of programs L of the broadcasting program broadcasted on the same day (current day) as the reference date (S151). In this process, the determining unit 181 of the broadcast pattern specifying unit 180 first determines whether or not the comparative program T[k] of the current day, or the target of comparison for determining whether or not the program is the same as the target program S, and the target program S are the same program, based on the EPG data of the current day extracted from the EPG acquiring unit 120 (S153). If determined that the target program S and the comparative program T[k] are the same program as a result of the determination, the number of program counting unit 183 of the broadcast pattern specifying unit 180 increases the number of same programs for the current day by one (S155), and increments the counter k by one (S157). If determined that the target program S and the comparative program T[k] are different programs as a result of the determination of step S153, the number of program counting unit 183 increments the counter k by one (S157). The series of processes of steps S153 to S157 are repeated until the counter k for the future reaches the number of programs L for the future, where the process proceeds to the next broadcast pattern extracting process (S170) when the counter k reaches L.

In the broadcast pattern extracting process, the broadcast pattern extracting unit 185 extracts the broadcast pattern of the target program S according to the number of same programs for the past, the future, and the current day acquired from the number of program counting unit 183. As shown in FIG. 11, in the broadcast pattern extracting process, the broadcast pattern extracting unit 185 first determines whether or not the number of programs same as the target program S for the past or for the future is two or more (S171). If determined that the number of programs same as the target program S for the past or for the future is two or more as a result of the determination, the broadcast pattern extracting unit 185 specifies the broadcast pattern of the target program S as the "(a) daily pattern" (S173), and the broadcast pattern extracting process is terminated.

If determined that the number of programs same as the target program S for the past or for the future is not two or more as a result of the determination of step S171, the broadcast pattern extracting unit 185 determines whether or not the number of programs same as the target program S for the past or for the future is one (S175). If determined that the number of programs same as the target program S for the past or for the future is one as a result of the determination, the broadcast pattern extracting unit 185 specifies the broadcast pattern of the target program S as the "(b) weekly pattern" (S177), and the broadcast pattern extracting process is terminated.

If determined that the number of programs same as the target program S for the past or for the future is not one is one as a result of the determination of step S175, the broadcast pattern extracting unit 185 determines whether or not the number of programs same as the target program S for the current day is one or more (S179). If determined that the number of programs same as the target program S for the current day is one or more as a result of the determination, the broadcast pattern extracting unit 185 specifies the broadcast pattern of the target program S as the "(d) continuous pattern" (S181), and the broadcast pattern extracting process is terminated. If determined that the number of programs same as the target program S for the current day is not one or more as a result of the determination of step S179, this means that the program same as the target program S does not exist in the past, the future, and the current day (number of same programs is zero), and thus the broadcast pattern extracting unit 185 specifies the broadcast pattern of the target program S as the "(c) special program pattern" (S183), and the broadcast pattern extracting process is terminated.

Therefore, in the broadcast pattern specifying process according to the present embodiment, the number of programs same as the target program S is counted using the EPG data for the past, for the future, and for the current day, and the broadcast pattern of the target program S is specified according to the counting results.

Now, the preference information generating process (S40) will be described with reference again to FIG. 6. The preference information generating process is a process of generating the preference information related to the broadcasting program subjected to weighting corresponding to the broadcast pattern of the broadcasting program based on the viewing history information representing the viewing history of the broadcasting program and the broadcast pattern specified by the broadcast pattern specifying unit. The preference information generating process will be further specifically described using a case in which the broadcast pattern is classified into the first to the fourth broadcast patterns by way of example.

In the preference information generating process according to the present embodiment, the weighting coefficient setting unit 191 first sets the weighting coefficient to be used for the weighting of the viewing number of times of the broadcasting program for every broadcast pattern. In the setting of the weighting coefficient, a large weighting coefficient is set for the broadcast pattern of the program with few broadcasting opportunity, and a small weighting coefficient is set for the broadcast pattern of the program with great broadcasting opportunity. In the examples of the first to the fourth broadcast patterns described above, the weighting coefficient setting unit 191 sets the weighting coefficient of the first broadcast pattern to 1, the weighting coefficient of the second broadcast pattern to 5, the weighting coefficient of the third broadcast pattern to 60, and the weighting coefficient of the fourth broadcast pattern to 1. By setting the weighting coefficient in such manner, the program of the third broadcast pattern of few broadcasting opportunity can be handled, even if viewed only once, similar to when the program of the first broadcast pattern of great broadcasting opportunity is viewed 60 times from the standpoint of the viewing history.

The viewing number of times calculating unit 193 calculates the past viewing number of times by the user of each broadcasting program based on the viewing history information stored in the storage unit 140. Specifically, the viewing number of times calculating unit 193 calculates the past viewing number of times of the user for each broadcasting program from the information such as the program name and the viewing day of the broadcasting program, which the user viewed in the past, stored in the storage unit 140.

Thereafter, the preference value calculating unit 195 calculates a preference value in which the weighting coefficient set by the weighting coefficient setting unit 191 is multiplied to the viewing number of times of the broadcasting program calculated by the viewing number of times calculating unit 193 according to the broadcast pattern of the broadcasting program specified by the broadcast pattern specifying unit 180. For instance, assume the past viewing number of times by the user for the programs A, B, C is 10 times, 1 time, and 40 times, respectively, when the broadcast pattern of the program A is specified as the second pattern, the broadcast pattern of the program B is specified as the third pattern, and the broadcast pattern of the program C is specified as the first pattern. The preference values of the programs A, B, C become $50(=10\times5)$, $60(=1\times60)$, $40(=40\times1)$.

The weight processing unit 197 then generates the preference information in which the viewing number of times is weighted based on the preference value calculated by the preference value calculating unit 195. Describing a specific example with the above-described example, since the preference values of the programs A, B, C calculated by the preference value calculating unit 195 are 50, 60, 40, the preference of the user becomes program B> program A> program C, where the information representing the degree of preference of the user is generated as the preference information in which the viewing number of times is weighted for every broadcast pattern without merely depending on the viewing number of times.

(Configuration of Information Processing Apparatus According to Second Embodiment of the Present Invention)

The information processing apparatus according to the second embodiment of the present invention will now be described.

In a recording device for acquiring the EPG (Electrical Program Guide) information contained in a broadcast signal obtained from the television broadcast wave transmitted from the broadcast station, the program (e.g., special program broadcasted only once a year) of a specific broadcast pattern is selected, and presentation to the user of the recording device, automatic recording, automatic reproduction, and the like (hereinafter referred to as "recommended") of the selected broadcasting program are performed. The method of selecting the special program and the like includes a method of analogizing a keyword, a genre of the program, a broadcast time, and the like, which are assumed to correspond to the program to be selected, from the supplementary information of the broadcasting program. In other words, for example, if the keyword "special program" is contained in the title of a certain program and the broadcast time is two or more hours, the recording device selects such program as the special program and recommends the same to the user.

For such method, a receiving device and a program notifying method of searching for a program that is an interest to the user using the keyword set by the user, the viewing behavior of the user, and the keyword corresponding to the program to be selected in the device, and notifying the matched program to the user are disclosed (see e.g., Japanese Patent Application Laid-Open No. 2003-18483).

If the program distribution server and the viewing information storing server are installed on the network and the tendency the user views a program (e.g., special program) of a specific type is strong, the information related to the viewing tendency of the server is generated by the viewing information storing server without using the keyword. A technique in which the viewing information storing server transmits the information to the program distribution server so that the program (e.g. special program) of strong viewing tendency of the user is stored on the program distribution server is disclosed (see e.g., Japanese Patent Application Laid-Open No. 2005-210336). According to such technique, the user can easily select and view the program of a specific type such as the special program.

However, in the case of the device and the method described in Japanese Patent Application Laid-Open No. 2003-18483, the broadcast program not including the information that matches the keyword set by the user or the keyword in the device in the supplementary information of the broadcasting program is not selected as the program (e.g., special program) to be recommended to the user, and is not notified to the user.

In the technique described in Japanese Patent Application Laid-Open No. 2005-210336, the information related to the viewing tendency of the user is used, and thus the user has to perform the act of repeatedly viewing the program of a special type and cause the viewing information storing server to learn, whereby a long time is required until the selection and the viewing of the program of a specific type by the user are facilitated.

In light of the foregoing, a second embodiment of the present invention desirably provides an information processing apparatus and an information processing method for selecting a broadcasting program of a specific type and recommending the same to the user, where the broadcasting program of a specific pattern can be more reliably selected and the viewing opportunity of the relevant program by the user can be increased.

According to the second embodiment of the present invention, in the information processing apparatus and the information processing method for selecting a broadcasting program of a specific type and recommending the same to the user, the broadcasting program of a specific broadcast pattern can be more reliably selected by identifying the broadcast pattern of the program based on the EPG data, and the viewing opportunity of the broadcasting program by the user can be increased.

<Regarding Function Configuration>

Figure 12:
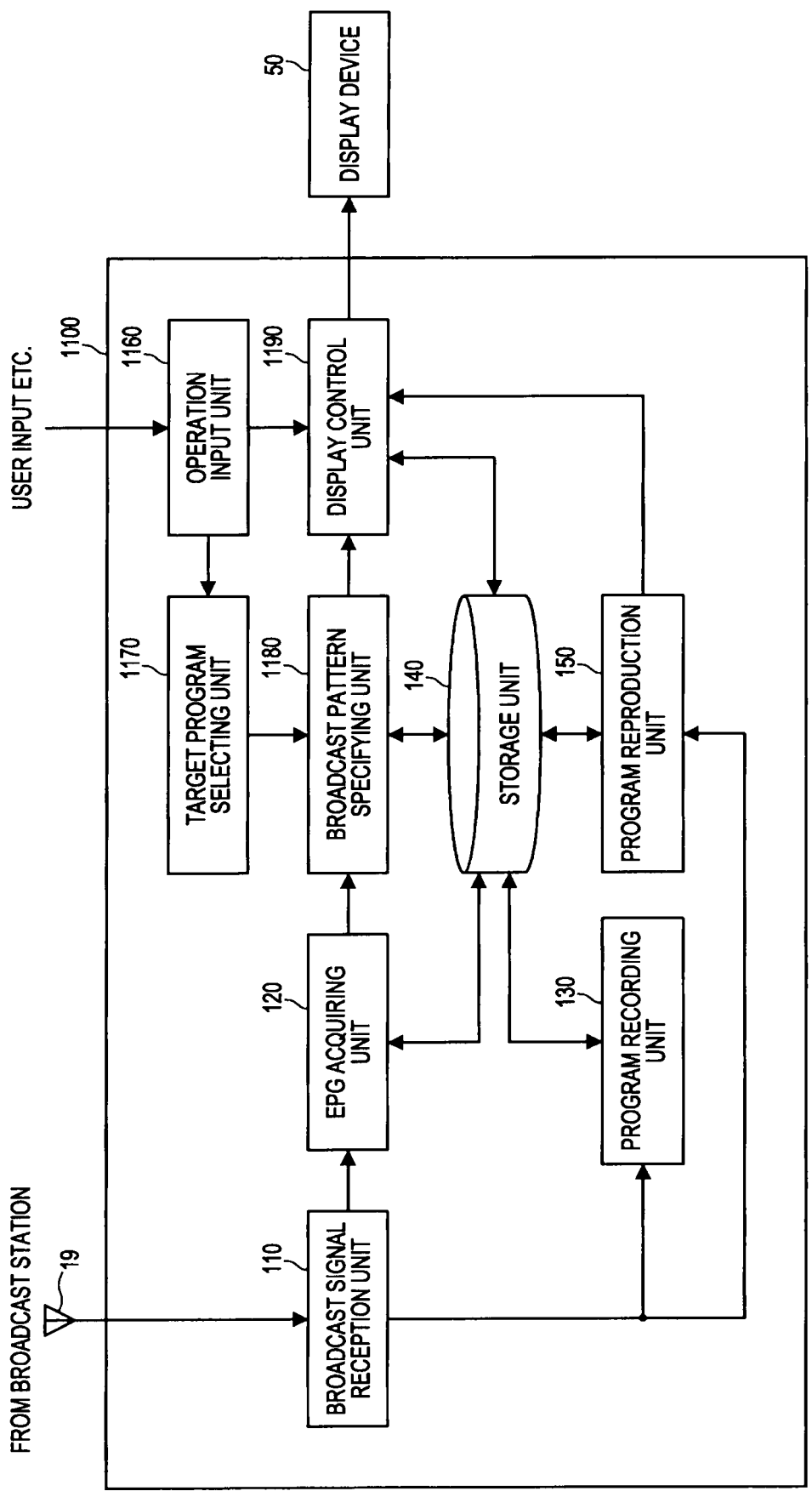
FIG. 12 is a block diagram showing one example of a function configuration of an information processing apparatus according to a second embodiment of the present invention.

First, the function configuration of an information processing apparatus according to the second embodiment of the present invention will be described with reference to FIG. 12. FIG. 12 is a block diagram showing a function configuration of a recording and reproducing device 1100 serving as an example of the information processing apparatus according to the second embodiment of the present invention.

The recording and reproducing device 1100 is a device capable of receiving a broadcast signal transmitted from a broadcast station and reproducing the broadcasting program and displaying on a display device (not shown) based on the received broadcast signal, and recording the broadcasting program on a recording medium based on the received broadcast signal. Specifically, as shown in FIG. 12, the recording and reproducing device 1100 mainly includes a broadcast signal reception unit 110, a EPG acquiring unit 120, a program recording unit 130, a storage unit 140, a program reproduction unit 150, an operation input unit 1160, a target program selecting unit 1170, a broadcast pattern specifying unit 1180, and a display control unit 1190. The description on the function configuration substantially the same as the first embodiment will be omitted in the following description.

The operation input unit 1160 generates an operation signal corresponding to the operation content of a button, a switch, a remote controller and a receiver thereof, which are arranged on the side surface of the housing etc. of the recording and reproducing device 1100, by the user, and outputs the generated operation signal to the target program selecting unit 1170 and the display control unit 1190.

The target program selecting unit 1170 selects a target program according to an input of the user operation signal from the operation input unit 1160. Here, the "target program" refers to the broadcasting program to be the target of determining whether or not the special program that satisfies the following condition (A) or (B) of a plurality of broadcast patterns of the broadcasting program classified by a predetermined criteria from a plurality of broadcasting programs corresponding to the broadcast signal transmitted from the broadcast station.

(A) Broadcasted only once within a predetermined period.

(B) Broadcasted two or more times within a predetermined period, but the broadcast time length for only one specific broadcast is longer than the broadcast time length of other broadcast, and the broadcast time length of one specific broadcast is longer than a predetermined broadcast time length (e.g., minimum broadcast time length for determining as the special program).

Specifically, when the broadcasting program to be the target of programmed recording is selected when the user attempts to perform programmed recording or when the user changes the channel to select and view the broadcasting program of a different channel, the target program selecting unit 1170 selects the broadcasting program to be the target of programmed recording or the broadcasting program of a different channel as the target program according to the operation signal of the operation request of programmed recording, the display request of a different channel, and the like from the operation input unit 1160.

The broadcast pattern specifying unit 1180 uses the EPG data of a reference date which is a broadcast date of the target program, the past EPG data within a predetermined number of days from the reference date, and the future EPG data within a predetermined number of days from the reference date to specify the broadcast pattern of the target program. In particular, the broadcast pattern of the target program is specified as the special program in the present embodiment. In this case, the broadcast pattern specifying unit 1180 acquires from the target program selecting unit 1170 the information indicating which broadcasting program is the target program (e.g., information on title of the broadcasting program and broadcast time slot). The broadcast pattern specifying unit 1180 also acquires the EPG data of the reference date and the future from the EPG data acquiring unit 120 and extracts the past EPG data from the storage unit 140.

Here, the "broadcast pattern" refers to a broadcasting mode of the broadcasting program such as the frequency the broadcasting program is broadcasted or the period the broadcasting program is broadcasted, and mainly includes the following four patterns.
(1) First broadcast pattern: Pattern in which the two or more of the same programs exist in the past within a predetermined number of days (e.g., one week) or in the future within a predetermined number of days (e.g., one week).
(2) Second pattern: Pattern in which one same program exists in the past within a predetermined number of days (e.g., one week) or in the future within a predetermined number of days (e.g., one week).
(3) Third broadcast pattern: Pattern in which the same program does not exist in any of the past within a predetermined number of days (e.g., one week), in the future within a predetermined number of days (e.g., one week) or the reference date.
(4) Fourth broadcast pattern: Pattern in which two or more of the same program exists in the past within a predetermined number of days (e.g., one week) or in the future within a predetermined number of days (e.g., one week), and the broadcast time length of the target program is longer than the broadcast time length of the same program existing by two or more.
(5) Fifth broadcast pattern: Pattern in which the same program exists singly in the past within a predetermined number of days (e.g., one week) or in the future within a predetermined number of days (e.g., one week), and the broadcast time length of the target program is longer than the broadcast time length of the same program that exists singly in the past and in the future.

The broadcast pattern specifying unit 1180 according to the present embodiment mainly determines whether or not the target program is a special program, where the broadcasting mode of the special program is broadly divided into (A) mode of being broadcasted only once within a predetermined period (mode where broadcasting is not periodically carried out and broadcasting is carried out only in a specific time of year); (B) mode of being broadcasted two or more times within a predetermined period, but the broadcast time length for only one specific broadcast is longer than the broadcast time length of other broadcast and the broadcast time length of one specific broadcast is longer than a predetermined broadcast time length (e.g., minimum broadcast time length for identifying as special program) (mode where broadcasting is periodically carried out but the broadcast time of only a specific broadcast is especially long compared to other broadcast). In terms of the five broadcast patterns described above, the third broadcast pattern corresponds to mode (A) and the fourth and the fifth broadcast patterns correspond to mode (B).

The specific examples of such broadcast patterns will be described in detail with reference to FIG. 13. FIG. 13 is an explanatory view showing one example of the broadcast pattern according to the present embodiment. In the example of FIG. 13, since the data for one week from the day the EPG data is acquired is often transmitted in the usual EPG data, the predetermined number of days in the first to the fifth broadcast patterns is set as one week. In FIGS. 13A to 13E, the horizontal direction shows the broadcasting day and the vertical direction shows the broadcast time slot, which broadcasting time band is further classified into morning, afternoon, night, and late night. In FIG. 13, the time slot of "morning" is from 5:00 to 11:00, the time slot of "afternoon" is from 11:00 to 17:00, the time slot of "night" is from 17:00 to 23:00, and the time slot of "late night" is after 23:00, but this is set for the sake of convenience, and the time slots of morning, afternoon, night, and late night are not limited thereto and may be appropriately set. Furthermore, in FIG. 13, the day of the week corresponding to the reference date is circled, the target program is shown with a black rectangle, and the program (hereinafter referred to as "comparative program") that becomes the comparison target of determining whether or not the same program as the target program is shown with an outlined rectangle. The length in the vertical direction of the target program and the comparative program shows the broadcasting tine length.

As shown in FIG. 13, assuming the predetermined number of days is one week, five types of broadcast pattern, (a) daily pattern corresponding to the first broadcast pattern, (b) weekly pattern corresponding to the second broadcast pattern, (c) special program pattern corresponding to the third broadcast pattern, (d) daily special program pattern corresponding to the fourth broadcast pattern, and (e) weekly special program pattern corresponding to the fifth broadcast pattern are provided.

The (a) daily pattern is the broadcast pattern of the program broadcasted in a constant time slot (in FIG. 13, 12:00 to 13:00) from Monday to Friday. The broadcast pattern specifying unit 1180 uses the EPG for the past one week and the EPG for the future one week with the reference date (Monday in FIG. 13), which is the broadcasting day of the target program, as the reference point, to examine whether the program same as the target program exists in the past one week and in the future one week. If the number of programs same as the target program of the comparative program broadcasted in past one week is two or more or if the number of programs same as the target program of the comparative program to be broadcasted in the future one week is two or more, the broadcast pattern specifying unit 1180 specifies the broadcast pattern of the target program as (a) daily pattern.

The (b) weekly pattern is the broadcast pattern of the program broadcasted in a constant time slot (in FIG. 13, 23:00 to 24:00 of Tuesday) of a certain day of the week every week. The broadcast pattern specifying unit 180 uses the EPG for the past one week and the EPG for the future one week with the reference date (Tuesday in FIG. 13) as the reference point to examine whether the program same as the target program exists in the past one week and in the future one week. If the number of programs same as the target program of the comparative program broadcasted in the past one week is only one or if the number of programs same as the target program of the comparative program to be broadcasted in the future one week is only one, the broadcast pattern specifying unit 1180 specifies the broadcast pattern of the target program as (b) weekly pattern.

The (c) special program pattern is a broadcast pattern such as a program specially broadcasted during a certain time of year (end of year and beginning of new year, summer period, etc.) every year or broadcasted only during the program changing period (e.g., special program broadcasted only at the end of year and beginning of the year, program ((e.g., one-story two hour drama etc.) broadcasted irregularly, and the like.) The broadcast pattern specifying unit 1180 uses the EPG on the reference date, the EPG for the past one week and the EPG for the future one week with the reference date (Saturday in FIG. 13) as the reference point to examine whether the program same as the target program exists on the same day as the reference date, in the past one week and in the future one week. If the program same as the target program does not exist in the comparative program broadcasted on the reference date, in the past one week or in the future one week (number of programs same as target number is zero), the broadcast pattern specifying unit 1180 specifies the broadcast pattern of the target program as (c) special program pattern.

The (d) daily special program pattern is the broadcast pattern of the program broadcasted in a constant time slot (12:00 to 13:00 in FIG. 13) from Monday to Friday, but the broadcast time length is longer than the usual broadcast (broadcast of comparative program) and longer than a predetermined broadcast time length (e.g., minimum broadcast time length for identifying as the special program) only for the broadcast of the reference date. The broadcast pattern specifying unit 1180 uses the EPG for the past one week and the EPG for the future one week with the reference date (Monday in FIG. 13), which is the broadcast date of the target program, as the reference point to examine whether the program same as the target program exists in the past one week and in the future one week. If the number of programs same as the target program is two or more in the comparative program broadcasted in the past one week or if the number of programs same as the target program is two or more in the comparative program broadcasted in the future one week, and the broadcast time length of the target program on the reference date is longer than the broadcast time of the same program and the broadcast time length of the target program is longer than or equal to a predetermined broadcast time (e.g., usual broadcast time+30 minutes or 2 hours), the broadcast pattern specifying unit 1180 specifies the broadcast pattern of the target program as (d) daily special program pattern.

The broadcast time slot of the (d) daily special program pattern is the broadcast time slot (broadcasting start time is the same) same as the broadcast time slot (usual broadcast time slot) of the same program in FIG. 13, but may not be the same broadcast time slot, and may be other broadcast time slot. Further, if the program of the daily special program pattern is broadcasted in the broadcast time slot different from the usual, the same program may be broadcasted in the same broadcast time slot as usual.

The (3) weekly special program pattern is the broadcast pattern of the program broadcasted in a constant time slot of a determined day of the week (23:00 to 24:00 of Tuesday in FIG. 13) every week, but the broadcast time length is longer than the usual broadcast (broadcast of comparative program) and longer than a predetermined broadcast time length (e.g., minimum broadcast time length for identifying as the special program) only for the broadcast of the reference date. The broadcast pattern specifying unit 1180 uses the EPG for the past one week and the EPG for the future one week with the reference date (Tuesday in FIG. 13) as the reference point to examine whether the program same as the target program exists in the past one week and in the future one week. If the number of programs same as the target program is only one in the comparative program broadcasted in the past one week and if the number of programs same as the target program is only one in the comparative program broadcasted in the future one week, and the broadcast time length of the target program on the reference date is longer than the broadcast time of the same program and the broadcast time length of the target program is longer than or equal to a predetermined broadcast time (e.g., usual broadcast time+30 minutes or 2 hours), the broadcast pattern specifying unit 1180 specifies the broadcast pattern of the target program as (e) weekly special program pattern.

Similar to the case of the (d) daily special program pattern, the broadcast time slot of the (e) weekly special program pattern is the broadcast time slot (broadcasting start time is the same) same as the broadcast time slot (usual broadcast time slot) of the same program in FIG. 13, but may not be the same broadcast time slot, and may be other broadcast time slot. Further, if the program of the (e) weekly special program pattern is broadcasted in the broadcast time slot different from the usual, the same program may be broadcasted in the same broadcast time slot as usual.

Figure 14:
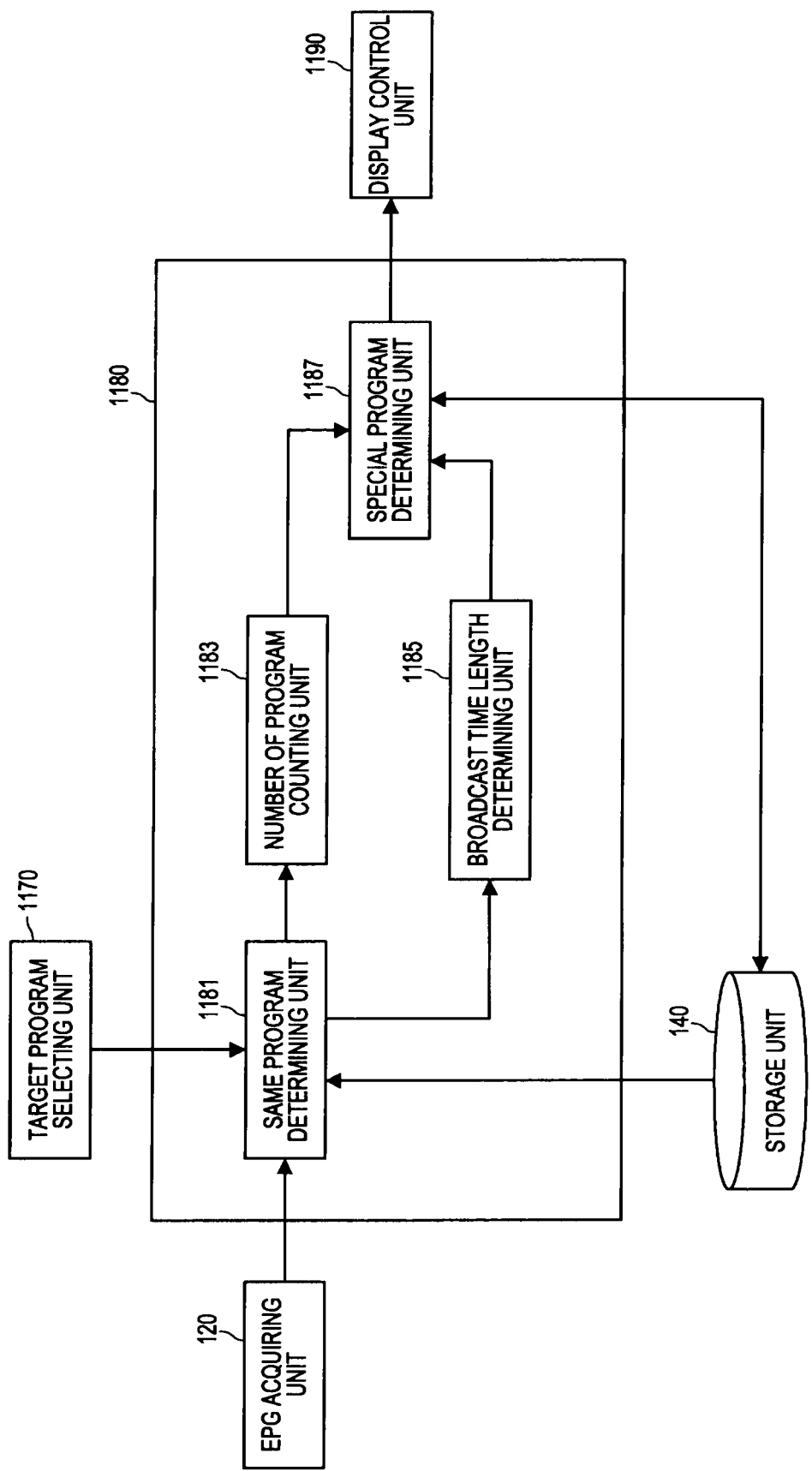
FIG. 14 is a block diagram showing a function configuration of a broadcast pattern specifying unit according to the embodiment.

The detailed function configuration of the broadcast pattern specifying unit 1180 described above for specifying the broadcast pattern will now be described with reference to FIG. 14. FIG. 14 is a block diagram showing the function configuration of the broadcast pattern specifying unit 1180 according to the present embodiment.

As shown in FIG. 14, the broadcast pattern specifying unit 1180 mainly includes a same program determining unit 1181, a number of program counting unit 1183, a broadcast time length determining unit 1185, and a special program determining unit 1187.

The same program determining unit 1181 determines whether or not a broadcasting program is the same as the target program for all the broadcasting programs (comparative programs) broadcasted in a respective period of in the past within a predetermined number of days (e.g., past one week), in the future within a predetermined number of days (e.g., future one week), and reference date. More specifically, the same program determining unit 1181 acquires from the target program selecting unit 1170 the information showing which broadcasting program is the target program (e.g., information on title of the broadcasting program, broadcast time slot etc.), extracts the EPG data of the past from the storage unit 140, and acquires the EPG data of the reference date and the future from the EPG acquiring unit 120. The same program determining unit 1181 then determines, for all the broadcasting programs broadcasted in the past, on the reference date, and in the future, based on the acquired information, whether the comparative program broadcasted in the past and the target program are the same, whether the comparative program to be broadcasted in the future and the target program are the same, and whether the comparative program broadcasted on the same day as the reference date and the target program are the same. The same program determining unit 1181 then notifies the number of program counting unit 1183 of the results of the determination. The same program determining unit 1181 also notifies the broadcast time length determining unit 1185 of the determination result when determined that the target program and the comparative program are the same as a result of the determination.

The number of program counting unit 1183 counts the number of same programs or the broadcasting program same as the target program in the respective period of the past, the future, and the reference date according to the determination result of the same program determining unit 1181. Specifically, the number of program counting unit 1183 increases the number of counts of the same program by one every time determination is made that the comparative program and the target program are the same as a result of the determination by the same program determining unit 1181. The counting of the same program is performed on the broadcasting programs of all of the past, the future, and the reference date. The number of program counting unit 1183 notifies the special program determining unit 1187 of the counted number of same programs.

The broadcast time length determining unit 1185 determines whether or not the broadcast time length of the target program is longer than the broadcast time length of the comparative program when determined that the comparative program is not the broadcasting program same as the target program in the determination by the same program determining unit 1181, and determines whether or not the broadcast time length of the target program is longer than the minimum broadcast time length (e.g., usual broadcast time+30 minutes or 2 hours) of the special program set in advance. The broadcast time length determining unit 1185 notifies the special program determining unit 1187 or the result of the determination related to the broadcast time length.

The special program determining unit 1187 determines whether or not the broadcast pattern of the target program is a special program based on the number of same programs in the past, the reference date, and the current day notified from the number of program counting unit 1183 and the determination result related to the broadcast time length notified from the broadcast time length determining unit 1185, as necessary. Specifically, the special program determining unit 1187 first determines that the target program is the special program when the number of same programs notified from the number of program counting unit 1183 is zero (broadcasting program same as the target program does not exist). Even if the number of same programs notified from the number of program counting unit 1183 is one or more, the special program determining unit 1187 determines that the target program is the special program when notified the determination result that the broadcast time length of the target program is longer than the broadcast time length of the same program and the broadcast time length of the target program is longer than the minimum broadcast time length from the broadcast time length determining unit 1185. In this case, the special program determining unit 1187 can also determine whether the target program is the fourth broadcast pattern (e.g., (d) daily special program pattern) or the fifth broadcast pattern (e.g., (e) weekly special program pattern) based on the number of same programs notified from the number of program counting unit 1183.

The special program determining unit 1187 notifies the display control unit 1190 of the determination result on whether or not the target program is the special program. Furthermore, the special program determining unit 1187 may record the information (information related to title of the broadcasting program, broadcasting day, etc.) related to the broadcasting program determined as the special program in the storage unit 140.

Figure 15:
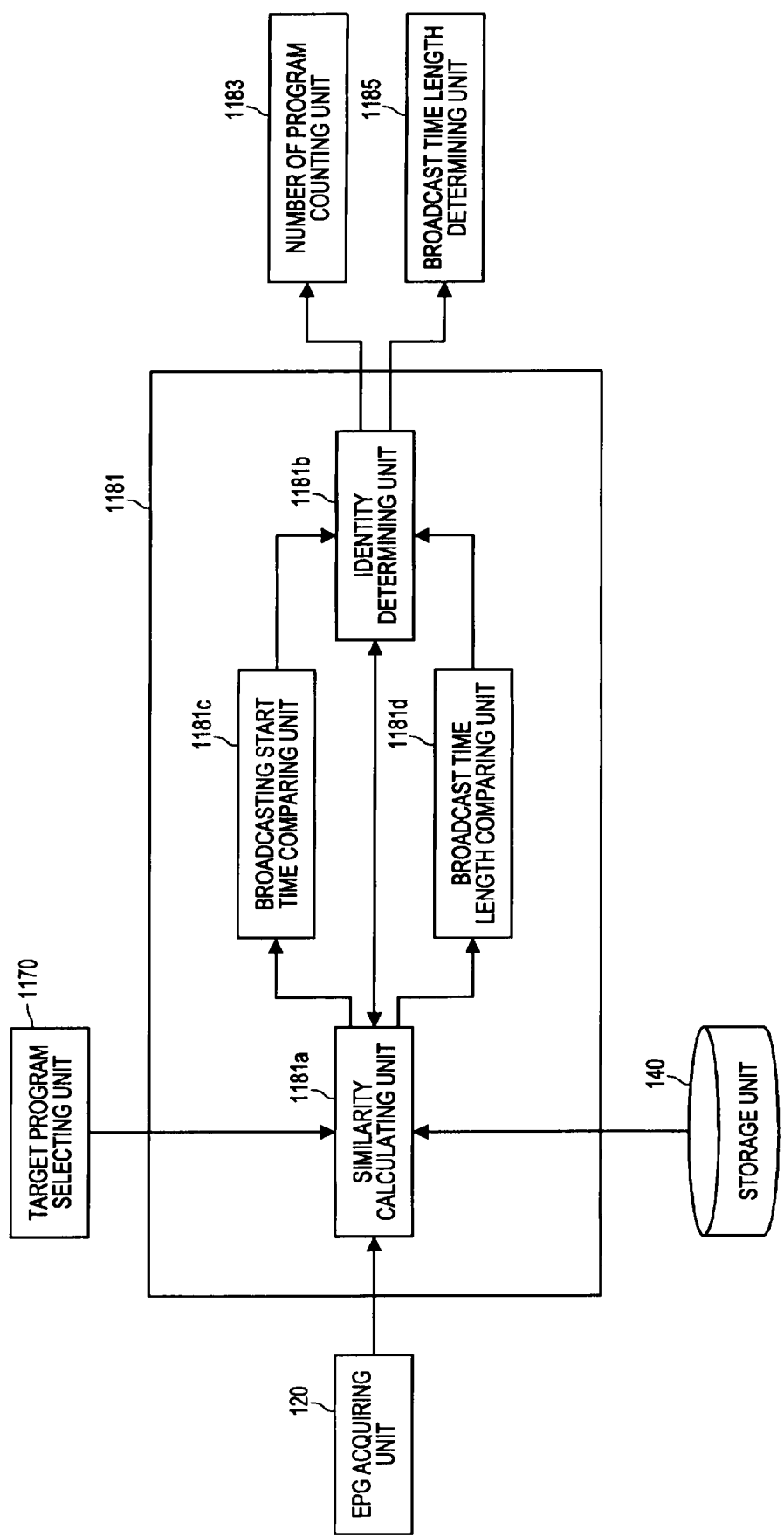
FIG. 15 is a block diagram showing a function configuration of the same program determining unit according to the embodiment.

Further detailed function configuration of the same program determining unit 1181 will be described below with reference to FIG. 15. FIG. 15 is a block diagram showing the function configuration of the same program determining unit 1181 according to the present embodiment.

As shown in FIG. 15, the same program determining unit 1181 mainly includes a similarity calculating unit 1181a, an identity determining unit 1181b, a broadcasting start time comparing unit 1181c, and a broadcast time length comparing unit 1181d.

The similarity calculating unit 1181a calculates the similarity of the program title of the target program acquired from the EPG acquiring unit 120 and the program title of the comparative program acquired from the EPG acquiring unit 120 or the storage unit 140. The similarity of the program title is calculated such that the similarity becomes higher the longer the LCS length based on the length of the LCS (Longest Common Subsequence) of the two program titles of the target program and the comparative program.

Here, "LCS" refers to a common partial sequence in which a character string of one or more characters appear in the same order between the two program titles. For instance, if the program title of the target program is "ABB" and the program title of the comparative program is "AAB", the pattern for corresponding the two titles includes the following four ways when calculating the LCS length thereof.
(1) First pattern: A common partial sequence A exists by the first character A of the title of the target program and the first character A of the title of the comparative program, and a common partial sequence B exists by the second character B of the title of the target program and the third character B of the title of the comparative program.
(2) Second pattern: A common partial sequence A exists by the first character A of the title of the target program and the first character A of the title of the comparative program, and a common partial sequence B exists by the third character B of the title of the target program and the third character B of the title of the comparative program.
(3) Third pattern: A common partial sequence AB exists by the first and second characters AB of the title of the target program and the second and third characters AB of the title of the comparative program.
(4) Fourth pattern: A common partial sequence A exists by the second character A of the title of the target program and the first character A of the title of the comparative program, and a common partial sequence B exists by the third character B of the title of the target program and the third character B of the title of the comparative program.

In this case, since the common partial sequence A and the common partial sequence B exist in the first pattern, the LCS length is $2(=1+1)$. Similarly, since the common partial sequence A and the common partial sequence B exist in the second pattern, the LCS length is $2(=1+1)$. Since the common partial sequence AB exists in the third pattern, the LCS length is 2. Since the common partial sequence A and the common partial sequence B exist in the fourth pattern, the LCS length is $2(=1+1)$.

Therefore, the pattern for corresponding the common partial sequence of the two program titles may exist in plurals, but the LCS length is known to be uniquely defined. However, the following issues arise if the LCS length is used as is to the similarity of the two program titles.

For instance, since the common partial sequence of "suzumebachi no su" and "konya sutato ao no sora", which are program titles respectively indicating different programs, is "su" and "no", the LCS length is $2(=1+1)$. Furthermore, since the common partial sequence of "mizuiro teikibin" and "mizuiro", which are titles of the same program" is "mizuiro", the LCS length is 2. Thus, when the common partial sequence of the two program titles is short and in particular, the LCS length is about 2, the two programs may be different or may be the same program. When the LCS length is used for the similarity, which is the determination criteria on whether or not the two program titles are of the same program, the determination on whether or not the two program titles are of the same program becomes difficult if the common unit of the two program titles is short (e.g., LCS length is about 2).

In the present embodiment, the sum of squares of the length of the common partial sequence is used for the similarity such that the similarity becomes greater the longer the common partial sequence. The similarity using the sum of squares is hereinafter described as LCS-sq. According to such calculation method of the similarity, the LCS-sq of the "suzumebachi no su" and "konya sutato ao no sora", which are program titles respectively indicating different programs" becomes 2(=12+ 12). The LCS-sq of the common partial sequence "mizuiro" of the "mizuiro teikibin" and "mizuiro", which are titles of the same program, becomes 4(=22), and thus determination on whether or not the same program can be made even if the LCS length is the same value.

If the sum of squares of the length of the common partial length is simply used for the similarity, the value of the similarity changes depending on which part of the program title to assume as the common partial sequence, and thus the similarity LCS-sq is calculated using the pattern in which the common partial sequence of the head side of the program title becomes the longest in the present embodiment so that the similarity is uniquely defined. For instance, in the title "nakayama masahiro no suiyou supotsu tengoku" and the title "nakayama masahiro no supoten" indicating the same program, the common partial sequence is "nakayama masahiro no" and "supo", and thus the similarity LCS-sq is $29(=5^2+2^2)$.

The sum of squares of the length of the common partial sequence may be calculated for all the patterns of the combination of the common partial sequence of the two program titles, and the maximum value may be set as the similarity LCS-sq of the two program titles.

The similarity calculating unit 1181a outputs the calculated similarity LCS-sq to the identity determining unit 1181b (broadcasting start time comparing unit 1181c and broadcast time length comparing unit 1181d, as necessary).

The identity determining unit 1181b determines whether or not the target program and the comparative program are the same program based on the similarity LCS-sq input from the similarity calculating unit 1181a, and outputs the determination result to the number of program counting unit 1183 (broadcast time length determining unit 1185, as necessary). Specifically, the identity determining unit 1181b determines whether or not the similarity LCS-sq is greater than or equal to a predetermined value (e.g., 4) set in advance, and determines as the same program if the similarity LCS-sq is greater than or equal to the predetermined value and determines as different programs if the similarity LCS-sq is smaller than the predetermined value.

In this case, the identity determining unit 1181b may select the top two programs (TMP1, 2) from the highest similarity LCS-sq if the comparative program which similarity LCS-sq with the target program is greater than or equal to the predetermined value exits by two or more. In this case, the identity determining unit 1181b notifies that the comparative program which similarity LCS-sq with the target program is greater than or equal to the predetermined value exits by two or more to the similarity calculating unit 1181a, and causes the similarity calculating unit 1181a to output the calculation result of the similarity LCS-sq to the broadcasting start time comparing unit 1181c and the broadcast time length comparing unit 1181d.

The broadcasting start time comparing unit 1181c compares the broadcasting start time of the top two programs (TMP1, 2) and the broadcasting start time of the target program if the comparative program which similarity LCS-sq with the target program is greater than or equal to the predetermined value exits by two or more, and outputs the result of comparison to the identity determining unit 1181b. The identity determining unit 1181b determines the program, of TMP1 or TMP2, which broadcasting start time is closer to the broadcasting start time of the target program (difference of broadcasting start time is smaller) as the program same as the target program. If the difference of the broadcasting start time of the TMP1 and the TMP2 is the same, the input of the comparison result by the broadcast time length comparing unit 1181d is waited.

The broadcast time length comparing unit 1181d compares the broadcast time length of the top two programs (TMP1, 2) when the comparative program which similarity LCS-sq with the target program is greater than or equal to the predetermined value exits by two or more, and the difference of the broadcasting start time of the TMP1 and the TMP2 is the same, and outputs the result of the comparison to the identity determining unit 1181b. The identity determining unit 1181b then determines the program, or TMP1 or TMP2, which broadcast time length is closer to the broadcast time length of the target program (difference of broadcast time length is smaller) as the program same as the target program.

The function configuration of the recording and reproducing device 1100 will now be again described with reference again to FIG. 12.

The display control unit 1190 D/A converts the broadcast signal transmitted from the program reproduction unit 150, and controls the display device 50 connected to the recording and reproducing device 1100 to output the video and the audio based on the D/A converted broadcast signal. The display device 50 may be a separate body from the recording and reproducing device 1100 as in the present embodiment, or may be a device in which the display device 50 and the recording and reproducing device 1100 are physically integrated. In the present embodiment, the display control unit 1190 displays, on the display screen of the display device 50, the display (special program display) indicating that the target program determined as the special program by the broadcast pattern specifying unit 1180 is a special program. The display that the broadcasting program is a special program thus outstands so that the user of the recording and reproducing device 1100 does not miss the viewing of the broadcasting program determined as the special program.

The method of the special program display includes the following three ways.

(1) Display a list of broadcasting programs specified as the special program on the display device 50.
(2) Add display data indicating that the target program is a special program to the EPG data acquired from the EPG acquiring unit, and causing the display device 50 to display the EPG data added with the display data.
(3) At the time point a channel broadcasting one broadcasting program is switched to a channel broadcasting another broadcasting program determined as the special program, a display indicating that another broadcasting program is a special program is displayed on the display device 50.

According to method of (1), the user can easily and collectively check only the broadcasting programs determined as the special program. The method of (1) is realized by preparing a "genre program guide" as a display method of the EPG (Electronic Program Guide) and preparing an item displaying only the "special program" for the sub-category. When the item displaying only the "special program" is selected, only the special program is formed into a list and displayed (see FIG. 18 to be hereinafter described).

According to the method of (2), not only the special program, and other broadcasting programs can be checked. The method of (2) is realized by adding a predetermined display such as a mark or a symbol that signifies special program to the field of the special program on the EPG (see FIG. 19 to be hereinafter described).

According to the method of (3), the opportunity the user searching for the program to view while zapping views the special program increases. The method of (3) is realized by displaying, when switched to the channel broadcasting the program determined as the special program, a predetermined display such as a mark or a symbol that signifies special program on a display screen of the display device 50 after channel switching (see FIG. 20 to be hereinafter described).

In addition, the display control unit 1190 may have the broadcasting program determined as the special program automatically recorded in the recording and reproducing device 1100, and cause the display device 50 to display a list of automatically recorded broadcasting programs or cause the display device 50 to display information related to the special program (program title, broadcasting start time, broadcast time length, etc.) a predetermined time before the broadcasting start time of the broadcasting program determined as the special program.

Thus, according to the recording and reproducing device 1100 of the present embodiment, the broadcast pattern specifying unit 1180 specifies the special program from the broadcast pattern using the EPG data, so that the special program that was unable to be specified in the related art (broadcasting program not including information that matches the keyword set by the user or the keyword in the device) can be found.

FIGS. 12 to 15 described above show configuration examples of the functions realized when the CPU (see FIG. 5) executes the program. Such functions may be realized by a different program, may be realized by a single program, or may be realized by hardware.

<Regarding Hardware Configuration>

The hardware configuration of the information processing apparatus 1100 according to the present embodiment for realizing the above-described functions is similar to FIG. 5 described above, and the description thereof will be omitted.

(Flow of Process of Information Processing Method According to the Second Embodiment of the Present Invention)

Figure 16:
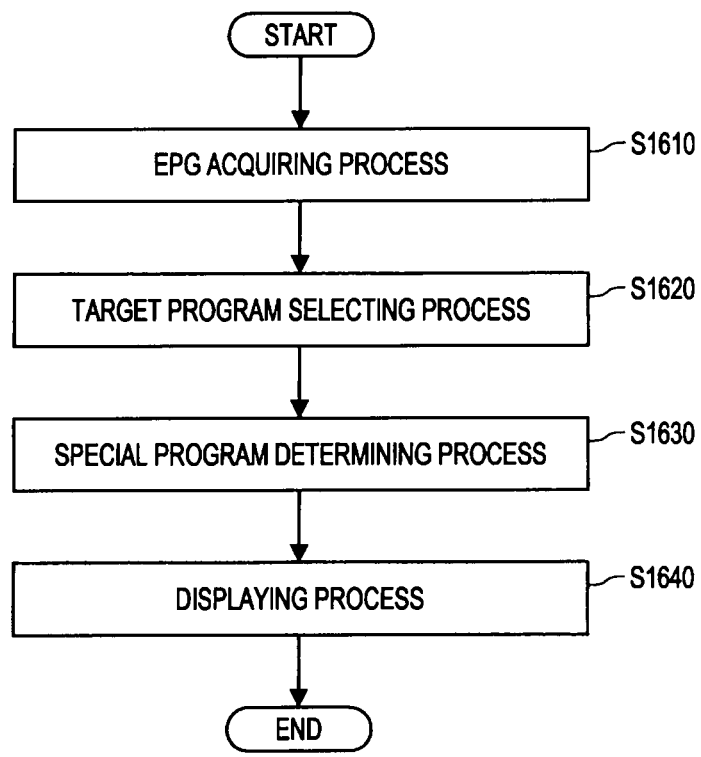
FIG. 16 is a flowchart showing the flow of the process of the entire information processing method according to the embodiment.

The recording and reproducing device 1100 has been described by way of example for the configuration of the information processing apparatus according to the present embodiment, and now, the flow of the process in the information processing method according to the present embodiment using such information processing apparatus will be described with reference to FIG. 16. FIG. 16 is a flowchart showing the flow of the entire process of the information processing method according to the present embodiment.

As shown in FIG. 16, the information processing method according to the present embodiment includes an EPG acquiring process (S1610), a target program selecting process (S1620), a special program determining process (S1630), and a displaying process (S1640), which are executed in such order. The EPG acquiring process (S1610) and the target program selecting process (S1620) may not be in such order, and the EPG acquiring process may be executed after the target program selecting process, or both processes may be simultaneously executed. Each process will be described below.

The EPG acquiring process (S1610) is a process the EPG acquiring unit 120 acquires the EPG (Electrical Program Guide) data related to the broadcasting program transmitted from the broadcast station with the broadcast signal received by the broadcast signal reception unit 110.

The target program selecting process (S1620) is a process the target program selecting unit 1170 selects the target program or the target determining whether or not the special program (A) broadcasted only once within a predetermined period or (B) broadcasted two or more times within a predetermined period, but the broadcast time length for only one specific broadcast is longer than the broadcast time length of other broadcast, and the broadcast time length of one specific broadcast is longer than a predetermined broadcast time length from a plurality of broadcast patterns of the broadcasting program classified by a predetermined criteria from the broadcasting programs according to the operation input etc. of the user. Specifically, when selecting the broadcasting program or the target of programmed recording when the user attempts to program record, or when the user changes the channel and selects and views the broadcasting program of a different channel, the target program selecting unit 1170 selects the broadcasting program or the target of the programmed recording or the broadcasting program of a different channel as the target program according to the signal of the operation request of the programmed recording or the display request of a different channel from the input unit (not shown).

The special program determining process (S1630) is a process the broadcast pattern specifying unit 1180 determines whether or not the broadcast pattern of the target program is the special program using the EPG data of the reference date or the broadcasting day of the target program, the past EPG data of before the previous day of the reference date, and the future EPG data of after the next day of the reference date.

Figure 17:
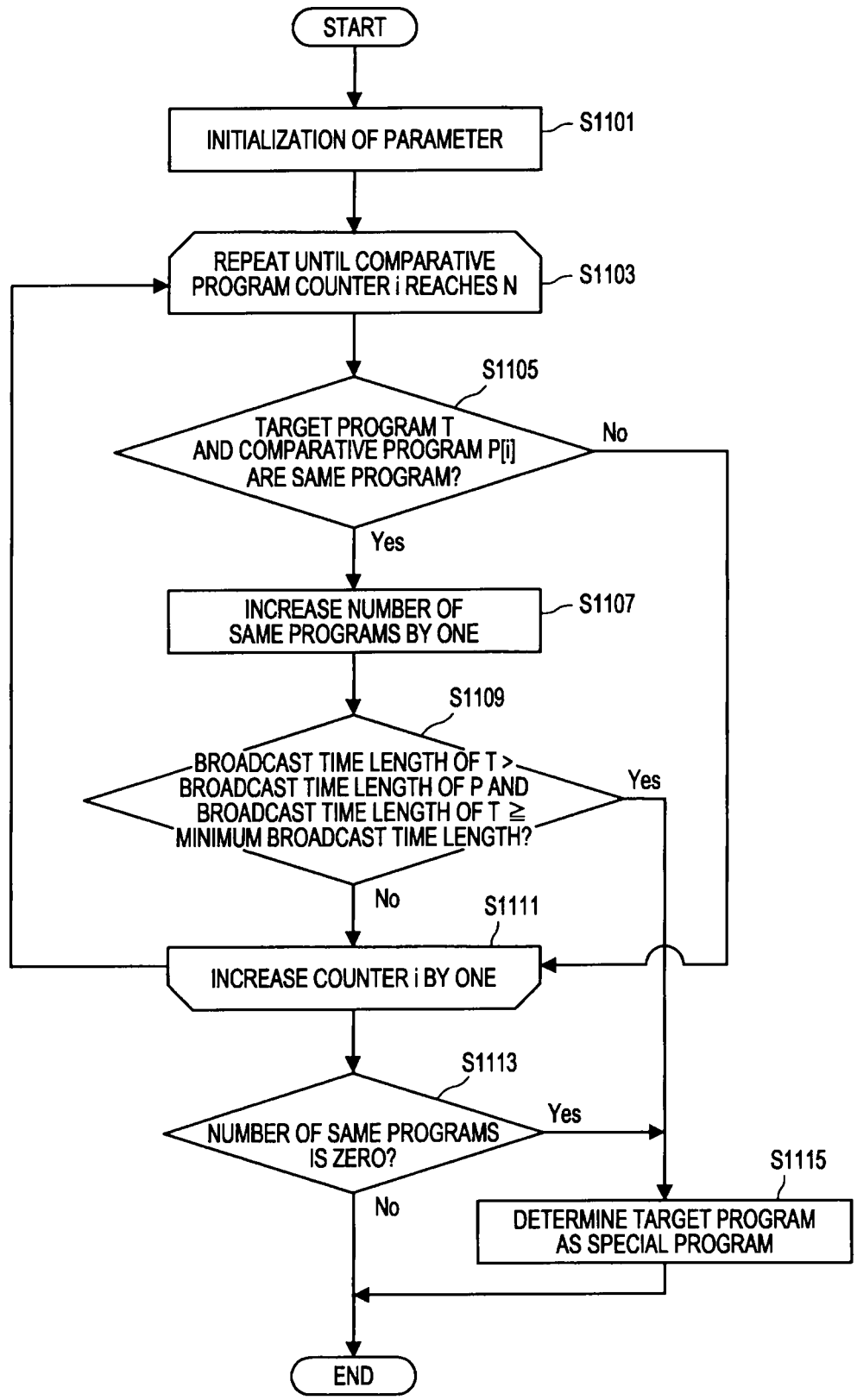
FIG. 17 is a flowchart showing the flow of the special program determining process according to the embodiment.

The flow of the special program determining process according to the present embodiment will be described in further detail with reference to FIG. 17. FIG. 17 is a flowchart showing the flow of the special program determining process according to the present embodiment. In FIG. 17, a case of determining whether or not the target program is a special program using the EPG data for the past one week, the current day of the reference date, and the future one week will be described by way of example.

As shown in FIG. 17, the parameter is first initialized in the special program determining process (S1101). Specifically, the number of programs same as the target program T of the programs broadcasted in the past one week, the programs broadcasted on the reference date, and the programs to be broadcasted in the future one week and a counter i (hereinafter referred to as "comparative program counter i") for comparison of the program for the past one week, the reference date, and the future one week and the target program T are respectively set to zero.

The counting (hereinafter referred to as "counting of same program") process of the number of programs same as the target program T in the programs broadcasted in past one week, the reference date, and the future one week is repeated until the counter i reaches the number of programs N of the broadcasting programs for the past one week, the reference date, and the future one week (S1103). In this process, the same program determining unit 1181 of the broadcast pattern specifying unit 1180 first determines whether or not the past comparative program P[i], or the target to be compared whether or not the same program as the target program T, and the target program T are the same program, based on the past EPG data extracted from the storage unit 140 and the EPG data of the reference date and the future acquired from the EPG acquiring unit 120 (S1105).

This determination is made using the similarity of the program titles (sum of squares LCS-sq of the LCS length of the common partial sequence of the program title), the difference of the broadcast start time, the difference of the broadcast time length, and the like for the target program T and the comparative program P[i].

If determined that the target program T and the comparative program P[i] are the same program as a result of the determination of S1105, the number of program counting unit 1183 of the broadcast pattern specifying unit 1180 increases the number of same programs by one (S1107).

The broadcast time length determining unit 1185 then determines whether or not the broadcast time length of the target program T is longer than the broadcast time length of the comparative program P[i], and whether or not the broadcast time length of the target program T is greater than or equal to the minimum broadcast time length for determining as the special program (S1109). If determined that the broadcast time length of the target program T is longer than the broadcast time length of the comparative program P[i], and that the broadcast time length of the target program T is greater than or equal to the minimum broadcast time length for determining as the special program as a result of the determination, the special program determining unit 1187 determines the target program T as the special program (S1115). If determined that at least one of the conditions that the broadcast time length of the target program T is shorter than the broadcast time length of the comparative program P[i] or the broadcast time length of the target program T is smaller than the minimum broadcast time length for determining as the special program is satisfied as a result of the determination of S1109, the number of program counting unit 1183 increments the counter i by one (S1111).

The number of program counting unit 1183 increments the counter i by one (S1111) even if determined that the target program T and the comparative program P[i] are different programs as a result of the determination of step S1105. The series of processes of steps S1105 to S1111 are repeated until the counter i reaches the number of broadcasting programs N for the past one week, the reference date, and the future one week, where the process proceeds to the next process (S1113) when the counter i reaches N.

In step S1113, the number of program counting unit 1183 outputs the result of the counting process of the same program to the special program determining unit 1187, and the special number determining unit 1187 determines whether or not the number of programs same as the target program T is zero based on the output result (S1113). If determined that the number of programs same as the target program T is zero as a result of the determination, the special program determining unit 1187 determines that the target program T is the special program (S1115). If determined that the number of same programs is not zero (i.e., one or more) as a result of the determination of step S1113, the special program determining process is terminated.

Figure 18:
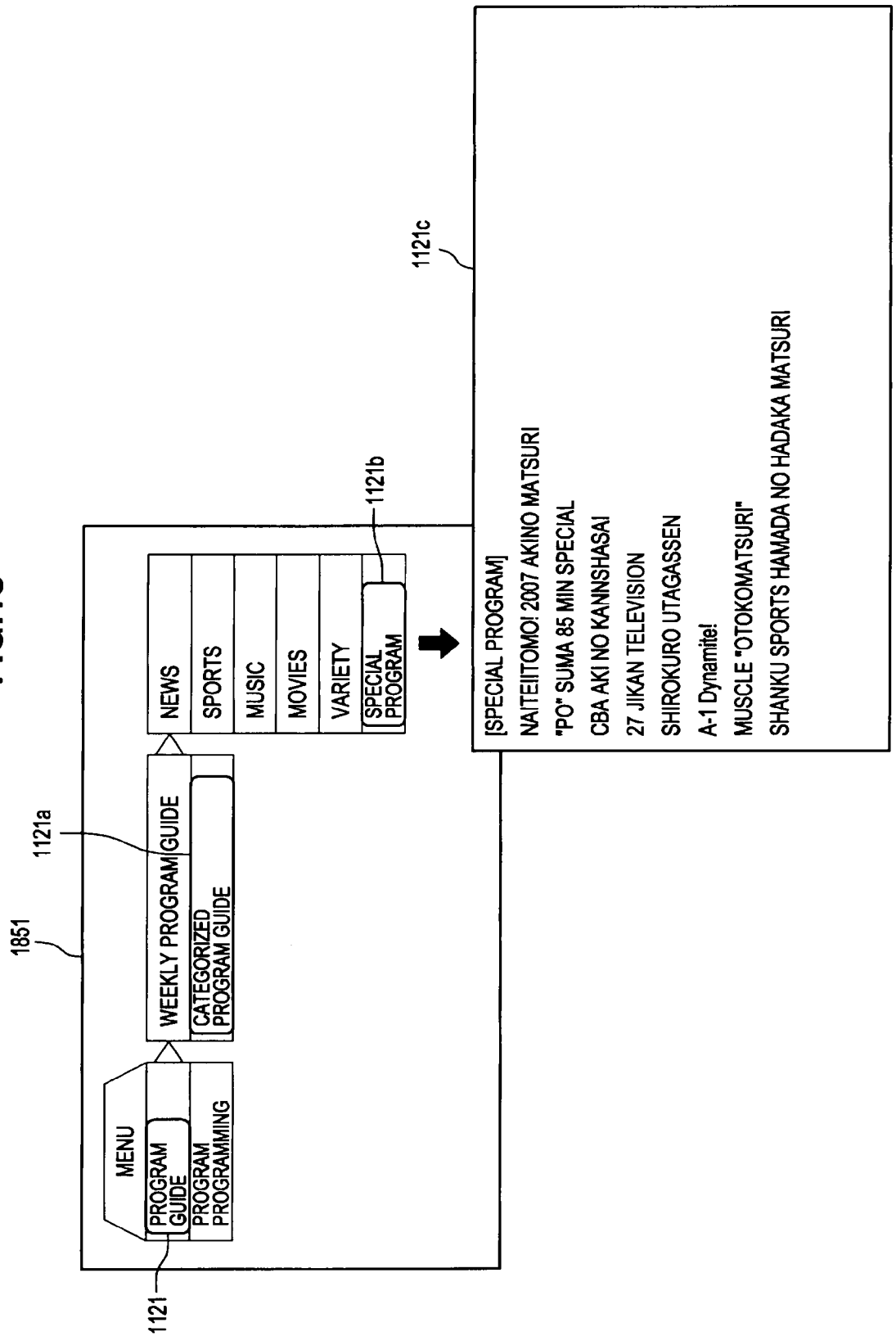
FIG. 18 is an explanatory view showing an example of the display method of the special program display by the display control unit according to the embodiment.

The displaying process (S1640) will now be described in detail with reference to FIG. 16 and FIGS. 18 to 20. FIGS. 18 to 20 are explanatory views showing an example of the display method of the special program display by the display control unit according to the present embodiment.

The displaying process is a process of displaying a display indicating that the target program determined as the special program by the broadcast pattern specifying unit 1180 is the special program on the display device 50. The mode of the displaying process includes the three patterns, as described above.

(1) Display a list of broadcasting programs specified as the special program on the display device 50.
(2) Add display data indicating that the target program is a special program to the EPG data acquired from the EPG acquiring unit, and cause the display device 50 to display the EPG data added with the display data.
(3) At the time point a channel broadcasting one broadcasting program is switched to a channel broadcasting another broadcasting program determined as the special program, a display indicating that another broadcasting program is a special program is displayed on the display device 50.

As shown in FIG. 18, the method of (1) can be realized by preparing an item 1121*a* of "genre program guide" as a display method of the EPG (Electronic Program Guide) 1121 displayed on the display screen 1851 and preparing an item 1121*b* displaying only the "special program" for the sub-category. When the item 1121*b* displaying only the "special program" is selected by a control signal based on the user operation and the like, a screen 1121*c* in which only the special program is formed into a list is displayed. According to such display method, the user can easily and collectively check only the broadcasting programs determined as the special program.

As shown in FIG. 19, the method of (2) can be realized by adding a predetermined display such as a mark 1121*e* or a symbol that signifies special program to the field 1121*d* of the special program on the EPG 1121. According to such display method, the user can check not only the special program but also other broadcasting programs, and easily select and view the special program from great number of broadcasting programs.

As shown in FIG. 3, the method of (3) can be realized by displaying, when switched to the channel broadcasting the program determined as the special program by user operation and the like, a predetermined display such as a mark 1121*e* or a symbol that signifies special program on a display screen 1851 of the display device 50 after channel switching. In this case, the display control unit 1190 may display the title 1121*f* and the like of the special program with the mark 1121*e* signifying the special program. According to such display method, the opportunity the user searching for the program to view while zapping views the special program increases.

It should be understood by those skilled in the art that various modifications, combinations, sub-combinations and alterations may occur depending on design requirements and other factors insofar as they are within the scope of the appended claims or the equivalents thereof.

For instance, a case in which the information processing apparatus is a recording and reproducing device has been described in each embodiment, but the information processing apparatus is not limited to the recording and reproducing device, and may be a device having only a recording function, a device having only a reproducing function, a device in which the recording and reproducing device and a display device are integrated, a display device with a built-in recording medium, and the like.

In the first embodiment described above, the generation of the preference information weighted on the viewing history is automatically performed after the specification of the broadcast pattern. However, after the broadcast pattern of the target program is specified, the specified broadcast pattern may be displayed on the display device by the display control unit and the like, and the weighting coefficient of each broadcast pattern may be set by user setting after the presentation to the user.

The present application contains subject matter related to that disclosed in Japanese Priority Patent Applications JP 2008-278109 filed in the Japan Patent Office on Oct. 29, 2008, and JP 2008-278108 filed in the Japan Patent Office on Oct. 29, 2008, the entire contents of each of which is hereby incorporated by reference.

What is claimed is:

1. An information processing apparatus, comprising:
an EPG acquiring computing device configured to acquire EPG (Electrical Program Guide) data related to a broadcasting program;
a selecting computing device configured to select a target program of the broadcasting program;

a broadcast pattern specifying computing device configured to specify a broadcast pattern of the target program using EPG data of a reference date, which is a broadcasting day of the target program, past EPG data within a predetermined number of days from the reference date, and future EPG data within a predetermined number of days from the reference date; and a preference information generation computing device configured to generate preference information related to the broadcasting program subjected to weighting corresponding to the broadcast pattern of the broadcasting program and viewing history information of the broadcasting, wherein the weighting corresponding to the broadcast pattern is inversely proportional to a number of times the broadcasting program is broadcasted in the broadcast pattern of the broadcast program, and the target program is determined as a special program upon determination that the target program is broadcasted two or more times within a predetermined period, but a broadcast time length for only one specific broadcast of the target program within the predetermined time period is longer than a broadcast time length of other broadcasts of the target program within the predetermined time period, and the broadcast time length of the one specific broadcast is longer than a minimum predetermined broadcast time length that is longer than the broadcast time length of the other broadcasts of the target program within the predetermined time period.

2. The information processing apparatus according to claim 1, wherein the preference information generation computing device weights viewing number of times of the broadcasting program calculated based on the viewing history information.

3. The information processing apparatus according to claim 2, wherein the preference information generation computing device includes, a weighting coefficient setting computing device configured to set a weighting coefficient used for weighting of the viewing number of times of the broadcasting program for every broadcast pattern, a preference value calculating computing device configured to calculate a preference value in which the weighting coefficient set by the weighting coefficient setting computing device is multiplied to the viewing number of times of the broadcasting program according to the broadcast pattern of the broadcasting program specified by the broadcast pattern specifying computing device, and a weight processing computing device configured to generate the preference information in which the viewing number of times is weighted based on the preference value.

4. The information processing apparatus according to claim 1, wherein the broadcast pattern specifying computing device includes, a determining computing device configured to determine whether or not the broadcasting program same as the target program for all the broadcasting programs broadcasted in a respective period of the past within the predetermined number of days, the future within the predetermined number of days, and the reference date, a number of program counting computing device configured to count number of same programs, which is the broadcasting program same as the target program in the respective period of the past, the future, and the reference date according to the determination result of the determining computing device, and a broadcast pattern extracting computing device configured to extract the broadcast pattern based on the number of same programs in the past, the number of same programs in the future, and the number of same programs on the reference date.

5. The information processing apparatus according to claim 4, wherein the broadcast pattern includes, a first broadcast pattern in which two or more of the same programs exist in the past within the predetermined number of days or in the future within the predetermined number of days, a second broadcast pattern in which one same program exists in the past within the predetermined number of days or in the future within the predetermined number of days, a third broadcast pattern in which the same program does not exist in any of the past within the predetermined number of days, the future within the predetermined number of days, and the reference date, and a fourth broadcast pattern in which one or more of the same program exist on the reference date.

6. The information processing apparatus according to claim 5, wherein the broadcast pattern extracting computing device, specifies the broadcast pattern of the target program as the first broadcast pattern when counted by the number of program counting computing device that the number of same programs in the past within the predetermined number of days or the future within the predetermined number of days is two or more, specifies the broadcast pattern of the target program as the second broadcast pattern when counted by the number of program counting computing device that the number of same programs in the past within the predetermined number of days or the future within the predetermined number of days is one, specifies the broadcast pattern of the target program as the third broadcast pattern when counted by the number of program counting computing device that the number of same programs in the past within the predetermined number of days, the future within the predetermined number of days, and the reference date is zero, and specifies the broadcast pattern of the target program as the fourth broadcast pattern when counted by the number of program counting computing device that the number of same programs on the reference date is one or more.

7. The information processing apparatus according to claim 1, further comprising:

a display control computing device configured to cause a display device to display a display indicating that the target program determined as the special program by the broadcast pattern specifying computing device is the special program.

8. The information processing apparatus according to claim 7, wherein the display control computing device causes the display device to display a list of special programs.

9. The information processing apparatus according to claim 7, wherein the display control computing device adds display data indicating that the target program is the special program to the EPG data acquired by the EPG acquiring computing device, and causes the display device to display the EPG data added with the display data.

10. The information processing apparatus according to claim 7, wherein the display control computing device causes the display device to display, at a time point a channel broadcasting one broadcasting program is switched to a channel broadcasting another broadcasting program determined as the special program, a display indicating that another program is the special program.

11. The information processing apparatus according to claim 1, wherein
the broadcast pattern specifying computing device includes,
a same program determining computing device configured to determine whether the broadcasting program same as the target program for all the broadcasting programs broadcasted in the past within the predetermined number of days, the reference date, and the future within the predetermined number of days,
a number of program counting computing device configured to count the number of same programs, which is the broadcasting program same as the target program in the past, the reference date, and the future according to the determination result of the same program determining computing device,
a broadcast time length determining computing device configured to determine whether a broadcast time length of the target program is longer than a broadcast time length of the comparative program and determining whether the broadcast time length of the target program is longer than a minimum broadcast time length of the special program set in advance, when determined that a comparative program, which is the broadcasting program of comparison target of the target program is the broadcasting program same as the target program in the determination by the same program determining computing device and
a special program determining computing device configured to determine whether or not a broadcast pattern of the target program is the special program according to the number of same programs by the number of program counting computing device or the determination result of the broadcast time length determining computing device.

12. The information processing apparatus according to claim 11, wherein the special program determining computing device determines that the broadcast pattern of the target program is the special program when (P) counted that the number of same programs is zero by the number of program counting computing device or (Q) determined that the broadcast time length of the target program is longer than the broadcast time length of the comparative program and the broadcast time length of the target program is longer than the minimum broadcast time length.

13. The information processing apparatus according to claim 1, wherein the broadcast pattern specifying computing device includes a determining computing device configured to determine whether or not the two or more broadcasts of the target program are the same broadcast program based upon a sum of squares of a length of a common partial sequence of EPG data.

14. An information processing method comprising the steps of:
acquiring EPG data related to a broadcasting program;
selecting a target program of the broadcasting;
specifying a broadcast pattern of the target program using EPG data of a reference date, which is a broadcasting day of the target program, EPG data before a previous day of the reference date and EPG data after a following day of the reference date; and
generating preference information related to the broadcasting program subjected to weighting corresponding to the broadcast pattern of the broadcasting program and viewing history information of the broadcasting program, wherein
the weighting corresponding to the broadcast pattern is inversely proportional to a number of times the broadcast program is broadcasted in the broadcast pattern of the broadcast program, and
the target program is determined as a special program upon determination that the target program is broadcasted two or more times within a predetermined period, but a broadcast time length for only one specific broadcast of the target program within the predetermined time period is longer than a broadcast time length of other broadcasts of the target program within the predetermined time period, and the broadcast time length of the one specific broadcast is longer than a minimum predetermined broadcast time length that is longer than the broadcast time length of the other broadcasts of the target program within the predetermined time period.

15. The information processing method according to claim 14, further comprising:
displaying, on a display of a display device upon determination that the target program is the special program, a display indicating that the target program is the special program.

16. An information processing apparatus, comprising:
EPG acquiring means for acquiring EPG (Electrical Program Guide) data related to a broadcasting program;
selecting means for selecting a target program of the broadcasting program;
broadcast pattern specifying means for specifying a broadcast pattern of the target program using EPG data of a reference date, which is a broadcasting day of the target program, past EPG data within a predetermined number of days from the reference date, and future EPG data within a predetermined number of days from the reference date; and
preference information generation means for generating preference information related to the broadcasting program subjected to weighting corresponding to the broadcast pattern of the broadcasting program and viewing history information of the broadcasting program, wherein
the weighting corresponding to the broadcast pattern is inversely proportional to the number of times the broadcast program is broadcasted in the broadcast pattern of the broadcast program, and
the target program is determined as a special program upon determination that the target program is broadcasted two or more times within a predetermined period, but a broadcast time length for only one specific broadcast of the target program within the predetermined time period is longer than a broadcast time length of other broadcasts of the target program within the predetermined time period, and the broadcast time length of the one specific broadcast is longer than a minimum predetermined broadcast time length that is longer than the broadcast time length of the other broadcasts of the target program within the predetermined time period.

17. The information processing apparatus according to claim 16, further comprising:
a display control computing device configured to cause a display device to display a display indicating that the target program determined as the special program by the broadcast pattern specifying computing means is the special program.

* * * * *